(12) United States Patent
Sato et al.

(10) Patent No.: US 7,196,677 B2
(45) Date of Patent: Mar. 27, 2007

(54) MULTI-PICTURE SIMULTANEOUS DISPLAY DEVICE, MULTI-PICTURE SIMULTANEOUS DISPLAY METHOD, VIDEO SIGNAL GENERATOR, AND RECORDING MEDIUM

(75) Inventors: Seiji Sato, Kanagawa (JP); Hidehiko Sekizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 10/900,872

(22) Filed: Jul. 28, 2004

(65) Prior Publication Data
US 2005/0007298 A1    Jan. 13, 2005

Related U.S. Application Data

(62) Division of application No. 10/182,584, filed on Jul. 31, 2002, now Pat. No. 6,956,543.

(51) Int. Cl.
G09G 5/00    (2006.01)
(52) U.S. Cl. .............. 345/1.3; 345/9; 348/52
(58) Field of Classification Search .......... 345/1.1–1.3, 345/2.1–2.3, 3.1–3.2, 5–6, 9, 22, 26, 87–88, 345/28; 348/51–52, 54, 57–58; 359/464–465, 359/618
See application file for complete search history.

(56) References Cited

U.S. PATENT DOCUMENTS 6,690,337 B1 * 2/2004 Mayer et al. ................ 345/1.1
6,956,543 B2 * 10/2005 Sato et al. ....................... 345/9

FOREIGN PATENT DOCUMENTS

| JP | 02-012295 | 1/1990 |
| JP | 05-197444 | 8/1993 |
| JP | 09-037192 | 2/1997 |
| JP | 11-249593 | * 9/1999 |

* cited by examiner

Primary Examiner—Richard Hjerpe
Assistant Examiner—Mansour M. Said
(74) Attorney, Agent, or Firm—Sonnenschein Nath & Rosenthal LLP

(57) ABSTRACT

There are provided: a display surface (20) (mixed picture display part) for assigning a plurality of pieces of video information, respectively, to a plurality of a first divided area (S-I), a second divided area (S-II) and a third divided area (S-III), so as to display the plurality of the pieces of the video information on the display surface (20); a first picture separating mechanism disposed on the display surface (20) corresponding to the first divided area (S-I) of the plurality of the divided areas (S-I, S-II, S-III), and defining a predetermined polarizing direction; a second picture separating mechanism disposed on the display surface (20) corresponding to the second divided area (S-II) and the third divided area (S-III) of the plurality of the divided areas (S-I, S-II, S-III), and defining a predetermined polarizing direction different from the polarizing direction of the first picture separating mechanism; mirrors (optical means) (31, 32) disposed rightward and leftward relative to the display surface (20) in such a manner as to form respective predetermined angles relative to the display surface (20); and a third picture separating mechanism (40) defining a polarizing direction same as the polarizing direction of the first picture separating mechanism, and allowing a picture displayed on the display surface (20) and a picture displayed on the mirror (31, 32) to pass through the third separating mechanism (40) for a viewer to view the pictures.

8 Claims, 29 Drawing Sheets

FIG. 2
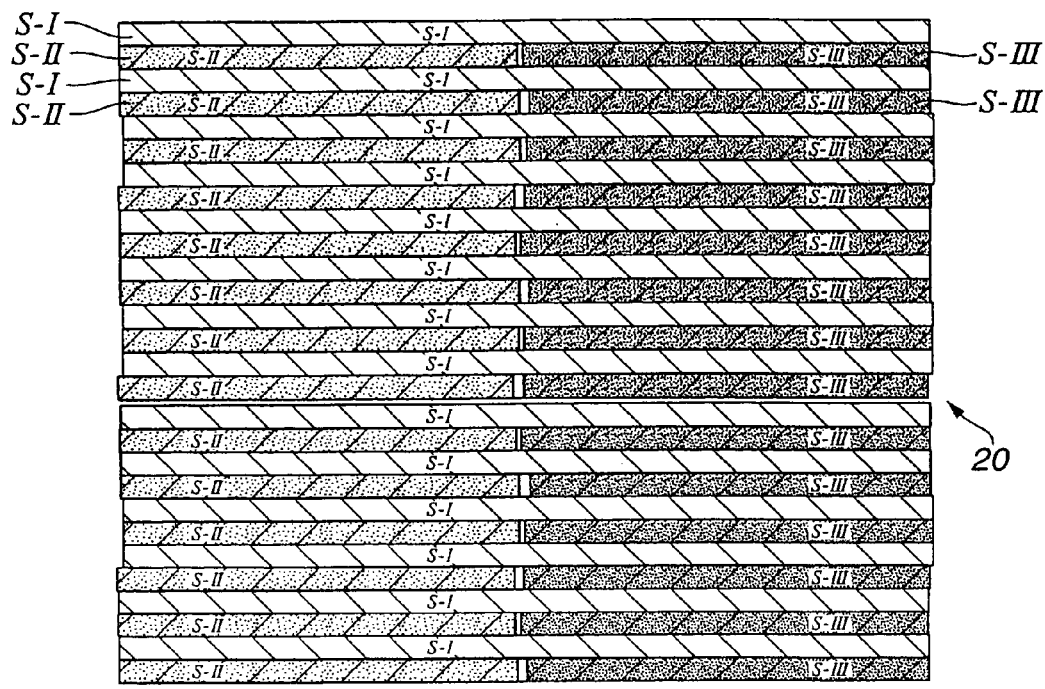
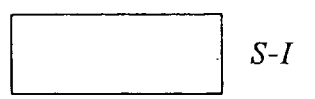

| 1 | 2 | 1 | 2 | 1 |  |  | 1 | 2 |
| 2 | 1 | 2 | 1 | 2 |  |  | 2 | 1 |
| 1 | 2 | 1 | 2 | 1 |  |  | 1 | 2 |
|   |   |   |   |   |  |  |   |   |
|   |   |   |   |   |  |  |   |   |
| 1 | 2 | 1 | 2 | 1 |  |  | 1 | 2 |
| 2 | 1 | 2 | 1 | 2 |  |  | 2 | 1 |

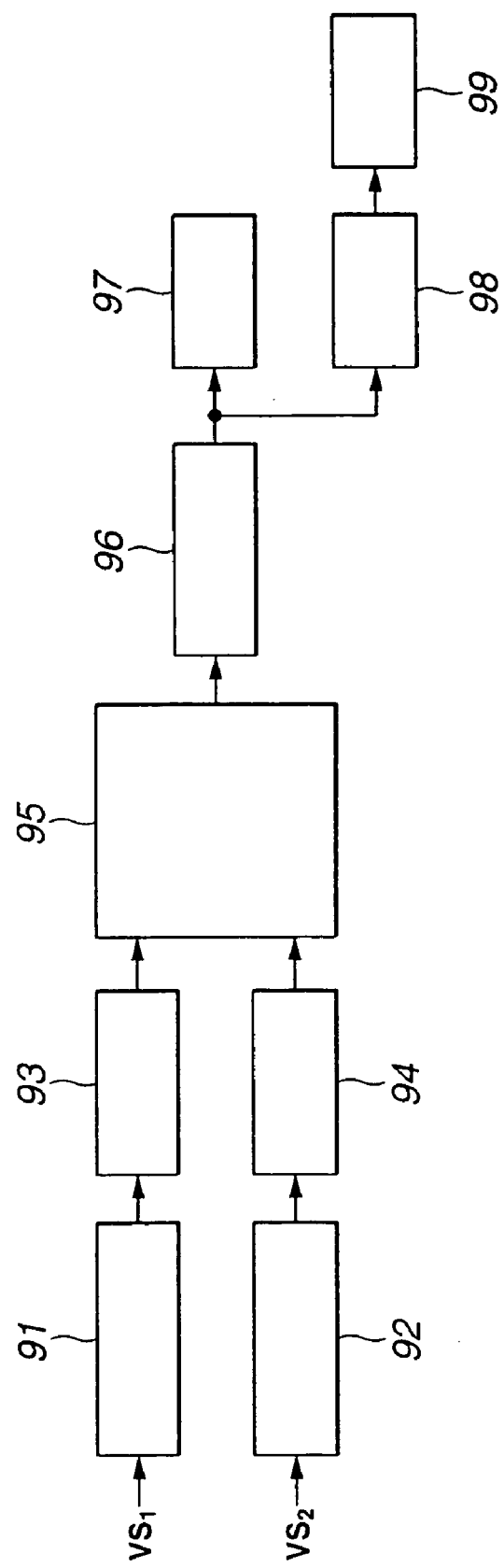

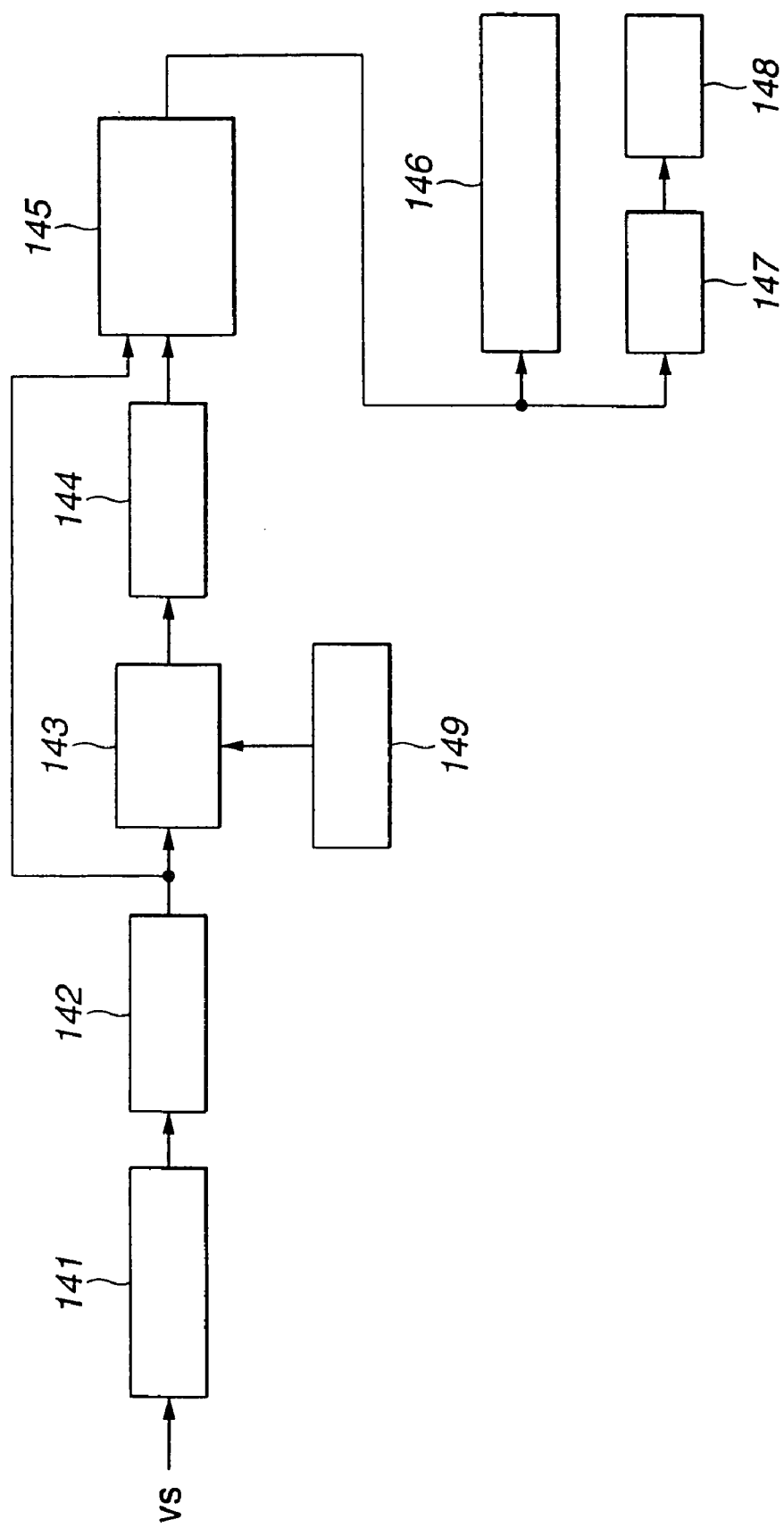

FIG. 31A
FIG. 31B
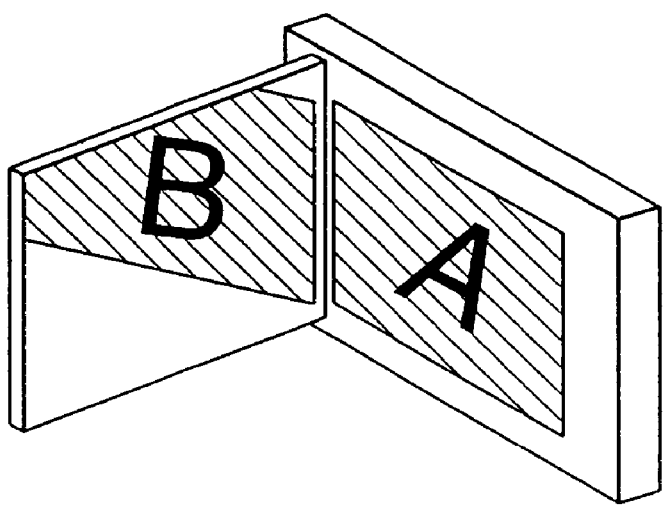
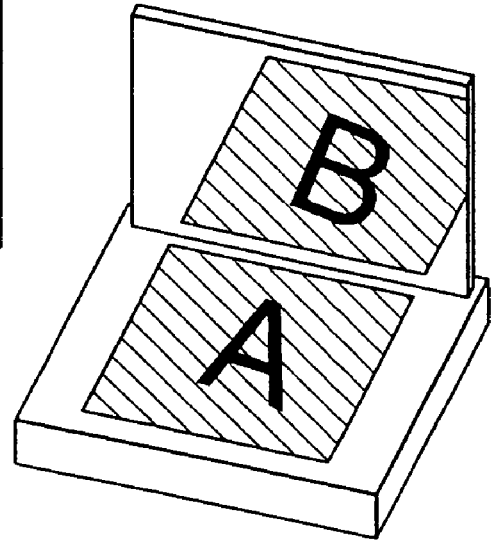

MULTI-PICTURE SIMULTANEOUS DISPLAY DEVICE, MULTI-PICTURE SIMULTANEOUS DISPLAY METHOD, VIDEO SIGNAL GENERATOR, AND RECORDING MEDIUM

RELATED APPLICATION DATA

The present application claims priority to Japanese Application Nos. P2000-029594 filed Feb. 7, 2000; P2000-029593 filed Feb. 7, 2000; P2000-029591 filed Feb. 7, 2000 and PCT/JP01/00842 filed Feb. 7, 2001 and is a divisional of U.S. application Ser. No. 10/182,584 filed Jul. 31, 2002 now U.S. Pat. No. 6,956,543, all of which are incorporated herein by reference to the extent permitted by law.

TECHNICAL FIELD

The present invention relates to a multi-picture simultaneous display device and a multi-picture simultaneous display method for displaying a plurality of screens on a single display surface. The present invention further relates to a video signal generator and a recording medium for displaying video information on the multi-picture display device.

BACKGROUND TECHNIQUE

With the recent information society, displaying more pieces of information is in great need. One known method is a multi-window for displaying a screen separated per section. A preferable example of the known method is a display terminal and the like of computer. Also in great need is a large screen such as a landscape of panoramic picture providing viewer with power.

In view of the above consumer needs, the present inventor had already proposed "a display device for allowing a viewer to view information with two pictorial sections in the same scale simultaneously on a single display surface," according to Japanese Patent Unexamined Publication No. Heisei 11 (1999)-249593. Concerning the panoramic large screen, the following methods are used: 1. For a static picture: enlargement especially of a silver salt photography and the like. 2. For a dynamic picture: projector used for cinema.

Herein, FIG. 30 and FIG. 31 show schematics of the display device, according to Japanese Patent Unexamined Publication No. Heisei 11 (1999)-249593. FIG. 30 shows a constitution of the display device separating two pictures with a mirror when polarizing angles form 45° relative to a horizontal direction and intersect orthogonally with each other in a form of Japanese katakana character "ハ".

As a display screen, a liquid crystal display screen 10 is used which has a polarizing plate 11a and a polarizing plate 11b adhered to a front surface of the liquid crystal display screen 10 in such a manner that the polarizing angles intersect orthogonally per line. The liquid crystal display screen 10 displays pictures for odd number lines and even number lines different from each other.

FIG. 30 shows the even number lines forming a polarizing angle 45° rightward upward and displays a picture "K", and the odd number lines forming a polarization angle 45° rightward downward and displays a picture "O." Through a polarizing plate 12 forming a polarizing angle 45° rightward upward, the viewer views that only the picture "K" of the even number lines (which match with the polarizing plate 12 in terms of polarizing angle) is separated from the liquid crystal display screen 10. On the other hand, through the polarizing plate 12, the viewer views that only the picture "O" of the odd number lines (which match with the polarizing plate 12 in terms of polarizing angle) is separated from a virtual image 14 (left side) copied on a mirror 13. The polarizing angle for the picture "O" is the one reversed from rightward downward to rightward upward.

Summarizing above, displaying two different pictures is achieved with ease by means of the display device that is constituted of the liquid crystal display screen 10 (with the polarizing plate 11a and the polarizing plate 11b adhered to the liquid crystal display screen 10), the mirror 13 and the polarizing plate 12.

FIG. 31 shows an external view of a commercial product having the display device separating two pictures with a mirror. FIG. 31A shows two different pictures displayed respectively on the left and right, while FIG. 31B shows two different pictures displayed respectively upward and downward.

The type of the polarizing plate is usually of glasses, but not limited thereto. In other words, another type of polarizing plate is available such as the one large enough to cover the two surfaces. In the latter case, the viewer is free from any inconveniences caused by wearing the glasses.

However, the multi-window method separates a single screen into small pieces. This makes a single area too small to view, thus causing the viewer to get tired. Moreover, the display device according to Japanese Patent Unexamined Publication No. Heisei 11 (1999)-249593 is for viewing two pictures, instead of displaying three pictures or more simultaneously.

The enlargement of the silver salt photography is, as a matter of course, not applicable to the display device of the information terminal. The projector for the cinema uses a small light source in the projector, which small light source is expanded. The thus expanded light is disadvantageous in terms of brightness. Therefore, the projector for the cinema is limited to indoor use.

The conventional display devices have some separating methods other than those described above. In the conventional display devices, a crosstalk between pictures is yet to be improved.

DISCLOSURE OF THE INVENTION

It is an object of the present invention to provide a multi-picture simultaneous display device and a multi-picture simultaneous display method for simultaneously viewably displaying, without fragmentation as seen in a multi-window, a mixed picture generated from an N-screen (N>2) picture.

It is another object of the present invention to provide a video signal generator and a recording medium serving the following functions: 1. obtain a high-quality multi-picture picture with no crosstalk, through various picture separating methods. 2. allow a viewer to view, simultaneously with an original picture, the following picture, information, and the like: i) a processed picture which is the original picture processed in various manners, ii) character information relating to the original picture, and iii) character information (required by a user) relating to the original picture.

A multi-picture simultaneous display device under the present invention comprises:

a mixed picture display part on which a plurality of pieces of video information are assigned, for display, to a plurality of respective divided areas of a display screen, the divided areas being divided by a rule;

a first picture separating mechanism disposed on the mixed picture display part corresponding to one of the plurality of the divided areas, the first picture separating mechanism defining a first polarizing element;

a second picture separating mechanism disposed on the mixed picture display part corresponding to the other of the plurality of the divided areas, the second picture separating mechanism defining a second polarizing element which is different in a polarizing direction from the first polarizing element of the first picture separating mechanism;

a plurality of optical means each of which is disposed in such a manner as to form a predetermined angle relative to the mixed picture display part;

a third picture separating mechanism for separating a picture displayed on the mixed picture display part and on the plurality of the optical means so as to allow the picture to be viewable, the third picture separating mechanism defining a third polarizing element which is equal in the polarizing direction to one of the first polarizing element of the first picture separating mechanism and the second polarizing element of the second picture separating mechanism.

The plurality of the divided areas of the mixed picture display part of the multi-picture simultaneous display device under the present invention comprise:

a first divided area defining one of the divided areas formed by dividing the display screen into a transverse direction belt-like; and at least one of the following two:

a second divided area and a third divided area defining the other of the divided areas formed by dividing the display screen into a transverse direction belt-like, the second divided area and the third divided area being separated, respectively, into left and right, and a fourth divided area and a fifth divided area defining the other of the divided areas formed by dividing the display screen into a transverse direction belt-like, the fourth divided area and the fifth divided area being separated, respectively, into upper and lower; and the plurality of the optical means of the multi-picture simultaneous display device under the present invention are characterized by being disposed in at least one of the following two manners:

sidewise relative to the mixed picture display part, and lengthwise relative to the mixed picture display part.

The first picture separating mechanism, the second picture separating mechanism, and the third picture separating mechanism of the multi-picture simultaneous display device under the present invention are characterized by being formed with a combination of a linearly polarizing element.

The first picture separating mechanism, the second picture separating mechanism, and the third picture separating mechanism of the multi-picture simultaneous display device under the present invention are characterized by being formed with a combination of a circularly polarizing element.

A multi-picture simultaneous display device under the present invention comprises:

a mixed picture display part for displaying the following two display modes by a switching operation per field:

a first display mode for displaying one piece of video information on an entire area of a display screen, and a second display mode for displaying the other pieces of the video information on a plurality of divided areas of the display screen in such a manner as to assign the other pieces of the video information to the respective divided areas which are divided by a rule;

a first picture separating mechanism disposed on the mixed picture display part, and defining a first polarizing element;

a plurality of optical means each of which is disposed in such a manner as to form a predetermined angle relative to the mixed picture display part; and a second picture separating mechanism for separating a picture displayed on the mixed picture display part and on the plurality of the optical means so as to allow the picture to be viewable, the second picture separating mechanism defining a second polarizing element which is different in a polarizing direction from the first polarizing element of the first picture separating mechanism; and is characterized in that the polarizing direction of one of the first picture separating mechanism and the second picture separating mechanism is switched synchronously with the switching operation of the first display mode and the second display mode.

The plurality of the optical means of the multi-picture simultaneous display device under the present invention are characterized by having such a function as to reverse a picture and to rotate a polarized light by reflection.

Each of the plurality of the optical means of the multi-picture simultaneous display device under the present invention is characterized by being a mirror.

The first picture separating mechanism and the second picture separating mechanism of the multi-picture simultaneous display device under the present invention are characterized by being formed with a combination of a linearly polarizing element.

The first picture separating mechanism and the second picture separating mechanism of the multi-picture simultaneous display device under the present invention are characterized by being formed with a combination of a circularly polarizing element.

The divided areas of the mixed picture display part of the multi-picture simultaneous display device under the present invention comprise at least one of the following two:

a first divided area and a second divided area formed by separating the display screen, respectively, into left and right, and a third divided area and a fourth divided area formed by separating the display screen, respectively, into upper and lower; and the plurality of the optical means of the multi-picture simultaneous display device under the present invention are characterized by being disposed in at least one of the following two manners:

sidewise relative to the mixed picture display part, and lengthwise relative to the mixed picture display part.

The plurality of the optical means of the multi-picture simultaneous display device under the present invention are characterized by having a door mechanism for opening and closing.

A multi-picture simultaneous display method under the present invention is:

characterized in that a plurality of pieces of video information are assigned, for display, to a plurality of respective divided areas of a display screen, the divided areas being divided by a rule; and characterized in that at least one of the plurality of the divided areas divided and displayed on the display screen is displayed on a plurality of optical means each of which is disposed at an end of the display screen, to thereby allow a picture to be viewable with a picture separating means, the picture being displayed on the display screen and on the plurality of the optical means.

A multi-picture simultaneous display method under the present invention is:

characterized in that the multi-picture simultaneous display method switchably displays the following two display modes by a switching operation per field:

a first display mode for displaying, of a plurality of pieces of video information, one piece of the video information on an entire area of a display screen, and a second display mode for displaying, of the plurality of the pieces of the video information, the other pieces of the video information on a plurality of divided areas of the display screen in such a manner as to assign the other pieces of the video information to the respective divided areas which are divided by a rule; and characterized in that a picture displayed on the display screen and on a plurality of optical means is allowed to be viewable with a picture separating means which switches the picture synchronously with the switching operation of the first display mode and the second display mode.

A multi-picture simultaneous display method under the present invention comprises:

a plurality of inputting steps of inputting a plurality of pieces of video information, respectively, into a mixed picture display part displaying the plurality of the pieces of the video information; and a step of generating a multi-picture display video information which is constituted in a form of a nest, the generating step having the following sub-steps of:

a step of reversing a display of the pieces of the video information to be displayed on a plurality of optical means, the reversed pieces being included in the plurality of the pieces of the video information inputted at the inputting steps, and a step of assigning sequentially the pieces of the video information to respective divided areas which are divided by a rule, to thereby generate the multi-picture display video information.

A multi-picture simultaneous display method under the present invention comprises:

a plurality of inputting steps of inputting a plurality of pieces of video information, respectively, into a mixed picture display part displaying the plurality of the pieces of the video information;

a step of processing at least one of the pieces of the video information, the processed pieces being included in the plurality of the pieces of the information inputted at the inputting steps; and a step of generating a multi-picture display video information which is constituted in a form of a nest, the generating step having the following sub-step of:

a step of assigning sequentially the pieces of the video information to respective divided areas which are divided by a rule, to thereby generate the multi-picture display video information.

The processed pieces of the video information of the multi-picture simultaneous display method under the present invention are characterized by including the following picture and information of the inputted video information: a static picture, a piece of extraction picture information, a piece of partly deletion picture information, a piece of enlarged picture information, a piece of different view-point picture information.

A multi-picture simultaneous display method under the present invention comprises:

a plurality of inputting steps of inputting a plurality of pieces of video information, respectively, into a mixed picture display part displaying the plurality of the pieces of the video information;

a step of processing at least one of the pieces of the video information, the processed pieces being included in the plurality of the pieces of the video information inputted at the inputting steps;

a step of reversing the pieces of the video information to be displayed on a plurality of optical means, the reversed pieces being included in one of the following two:

the plurality of the pieces of the video information inputted at the inputting steps, and the at least one of the pieces of the video information processed at the processing step; and a step of generating a multi-picture display video information which is constituted in a form of a nest, the generating step having the following sub-step of:

a step of assigning sequentially the pieces of the video information to respective divided areas which are divided by a rule, to thereby generate the multi-picture display video information.

The processed pieces of the video information of the multi-picture simultaneous display method under the present invention are characterized by including the following picture and information of the inputted video information: a static picture, a piece of extraction picture information, a piece of partly deletion picture information, a piece of enlarged picture information, a piece of different view-point picture information.

A video signal generator for supplying a video signal to a picture display device, comprises:

a first input means for inputting a first video information observed by a display part squarely;

a second input means for inputting a second video information observed by seeing the mixed picture display part in the plurality of the mirrors; and an output means reversing one of the first video information inputted by the first input means and the second video information inputted by the second input means so that the thus reversed video information is displayed opposite to the other of the first video information and the second video information, the output means assigning the first video information and the second video information to respective display areas on the mixed picture display part, and the output means outputting a video signal which is so constituted that the first video information and the second video information are displayed alternately, in a form of a nest, on the mixed picture display part.

A recording medium wherein a multi-picture display video information is recorded in a form of a nest under the present invention by the following steps of:

a step of inputting a plurality of pieces of video information, into a mixed picture display part displaying the plurality of the pieces of the video information;

a step of reversing the pieces of the video information to be displayed on a plurality of optical means, the reversed pieces being included in the pieces of the video information inputted at the inputting step; and a step of assigning sequentially the pieces of the video information to respective divided areas which are divided by a rule.

BRIEF EXPLANATION OF THE DRAWINGS

FIG. 2 is a constitution of an important part showing details of a mixed picture on a display surface, according to a first mode for carrying out the invention;

FIG. 7 is a third mode for carrying out the invention, in which,

FIG. 14 is the mode for carrying out the invention, showing a block diagram of a constitution of a system for generating the multi-picture display video information;

FIG. 16 is a first mode for carrying out the invention applied to a two-screen display video information generating system, in which.

FIG. 18 is the first mode for carrying out the invention, in which,

FIG. 19 is the first mode for carrying out the invention, in which,

FIG. 20 is the first mode for carrying out the invention, in which,

FIG. 21 is the first mode for carrying out the invention, showing a block diagram of a constitution of the two-screen display video information generating system;

FIG. 22 is a second mode for carrying out the invention applied to the two-screen display video information generating system, in which.

FIG. 23 is the second mode for carrying out the invention, in which,

FIG. 25 is a third mode for carrying out the invention applied to the two-screen display video information generating system, in which.

FIG. 29 is the fourth mode for carrying out the invention, explaining expansion of a working area and an expanded display, and the like;

FIG. 31 is a perspective view of an external appearance of a commercial product to which the display device separating the two pictures with the mirror is applied, according to a conventional art.

BEST MODE FOR CARRYING OUT THE INVENTION

Figure 1:
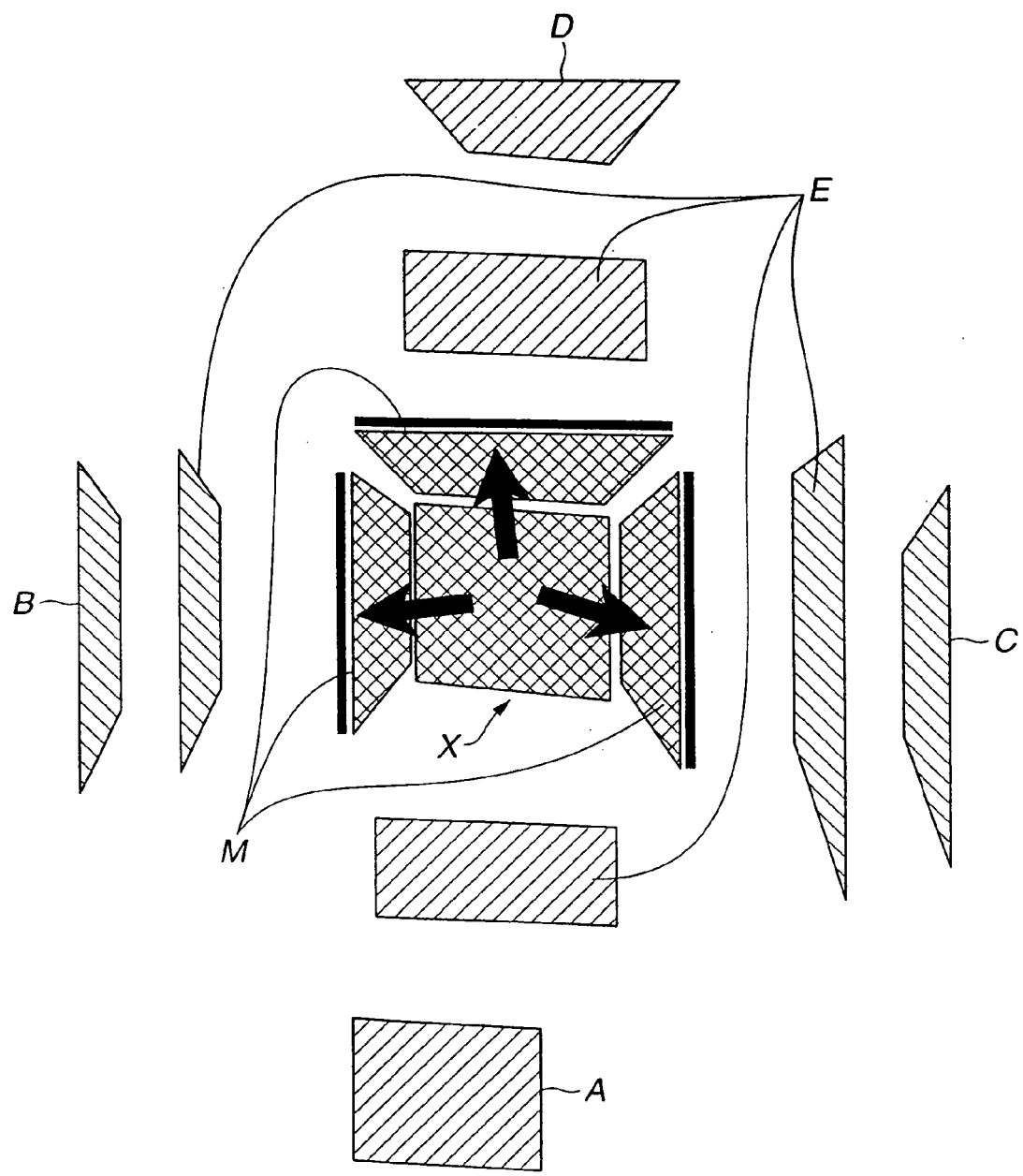
FIG. 1 is a conceptual drawing for explaining an entire constitution of a multi-picture simultaneous display device under the present invention.
Figure 3:
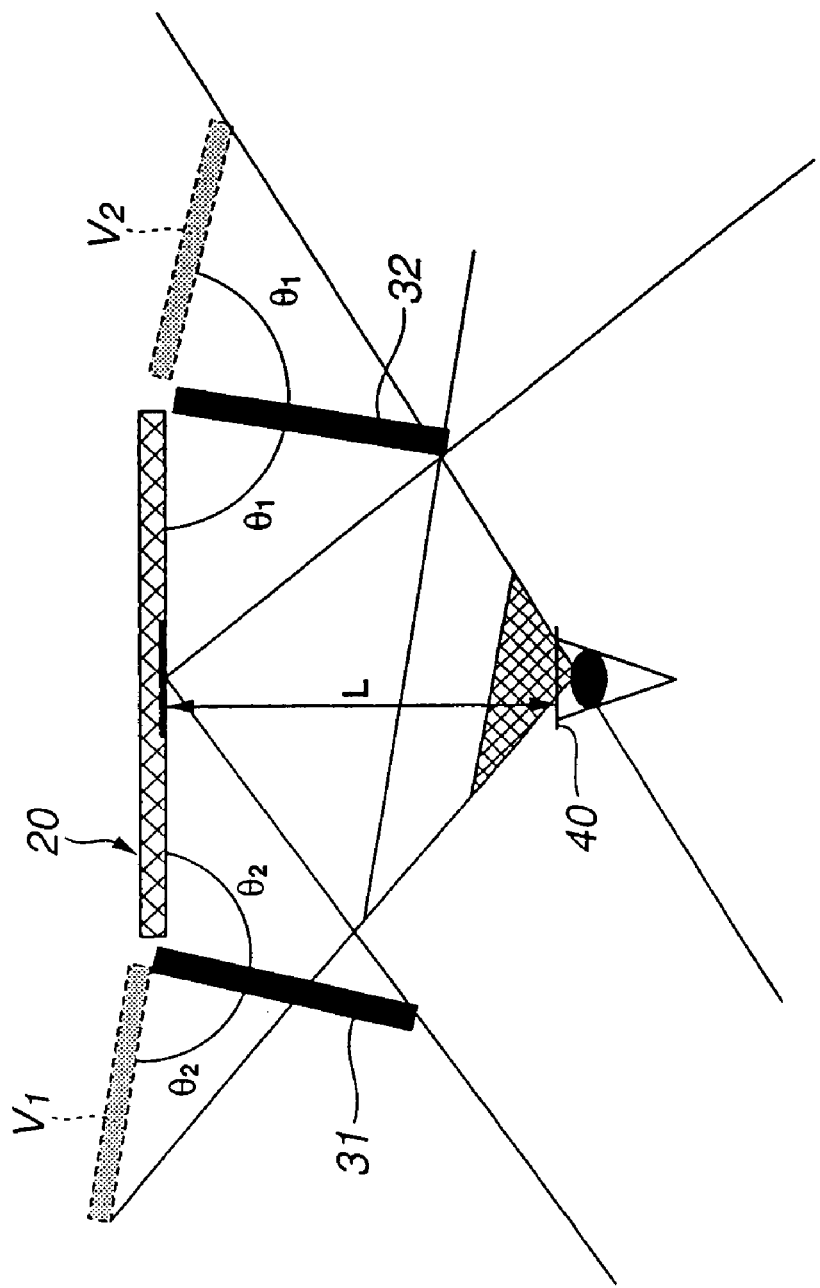
FIG. 3 is a plan view of a constitution, according to the first mode for carrying out the invention.
Figure 4:
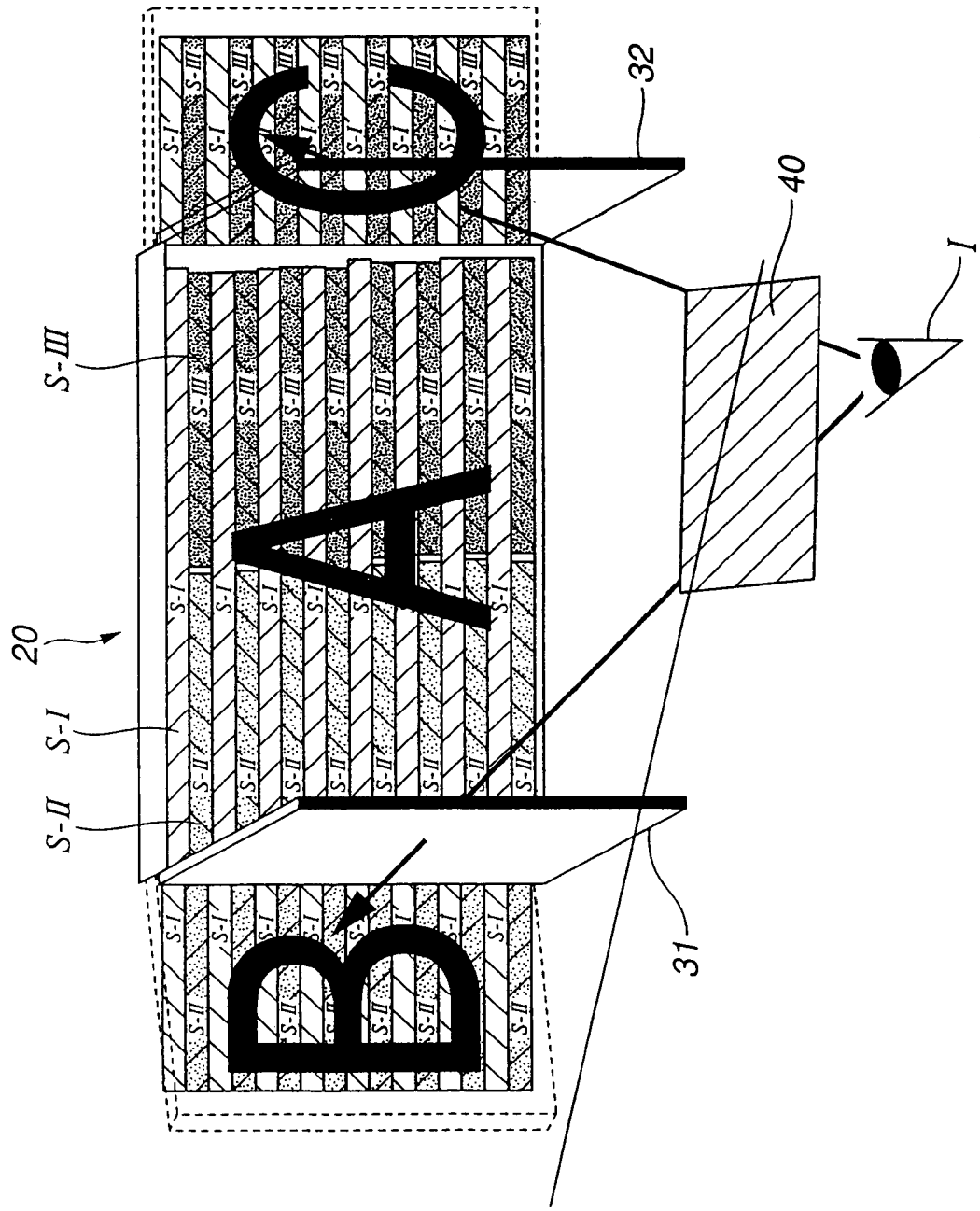
FIG. 4 is a perspective view of the constitution, according to the first mode for carrying out the invention.

Described hereinafter is a mode for carrying out the invention, referring to attached drawings. At first, FIG. 1 shows a schematic constitution of one of the modes for carrying out the invention. FIG. 2 to FIG. 4 show a first mode for carrying out the invention. FIG. 2 shows a schematic of the example of the first mode for carrying out the invention. FIG. 3 shows a detailed drawing of a mixed picture copied on a display surface in FIG. 2. FIG. 4 shows a constitution viewed from an upper side.

Figure 5:
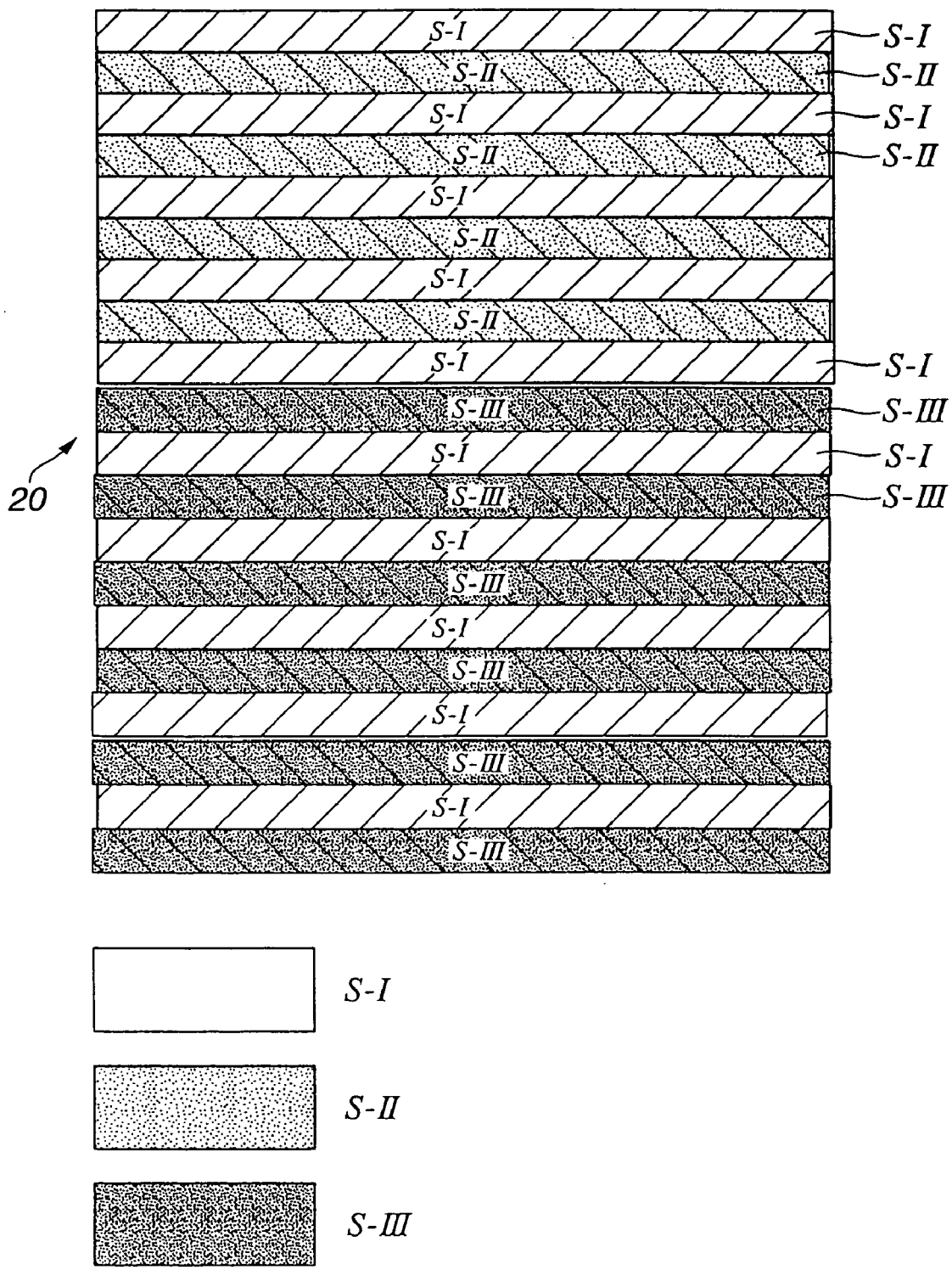
FIG. 5 is a constitution of a material part showing details of a mixed picture on a display surface, according to a second mode for carrying out the invention.
Figure 6:
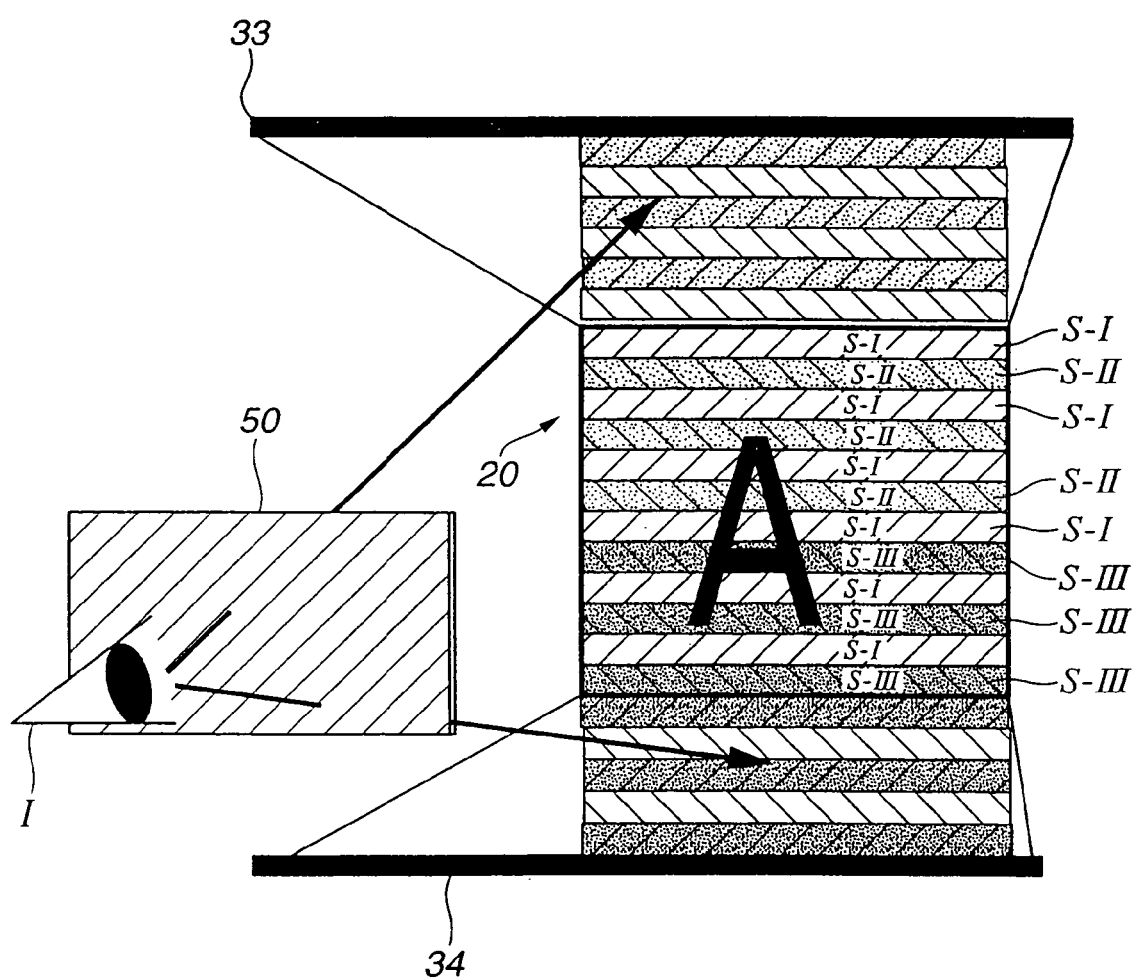
FIG. 6 is a perspective view of a constitution, according to the second mode for carrying out the invention.

FIG. 5 and FIG. 6 show a second mode for carrying out the invention, in which the display surface extends leftward and rightward, as compared with the display surface extending upward and downward according to the first mode for carrying out the invention. FIG. 7 shows a third mode for carrying out the invention, in which the display surface extends upward, downward, rightward, and leftward. Shown in FIG. 8 include elapsed time, display surface of the display device, direction of polarized light of picture separating mechanism, and displayed picture, according to a fourth mode for carrying out the invention using a switchable glasses. FIG. 9 shows an example of a movable display device with the display screen, according to a fifth mode for carrying out the invention.

As is seen in FIG. 1, the present invention is constituted of a mixed picture display part X, a mirror M (optical means), and a picture separating mechanism E. A plurality of pieces of video information are assigned respectively to a plurality of divided areas. The thus assigned pieces of video information are displayed on the mixed picture display part X. The mirror M is disposed in such a manner as to form a predetermined angle relative to the mixed picture display part X. The picture separating mechanism E has a predetermined polarizing direction.

A display surface of the mixed picture display part X should meet a minimum requirement for display function. Ordinarily used for the mixed picture display part X are a liquid crystal display element (hereinafter referred to as "LCD"), a cold cathode ray tube (hereinafter referred to as "CRT"), an LED display, a plasma display (hereinafter referred to as "PDP"), an electroluminescence (hereinafter referred to as "EL"), a field effect diode (hereafter referred to as "FED") and the like.

Use of a screen type projector for the display surface contributes to easy enlargement of the picture. In this case, however, the screen should not disorder the means for separating function of separating polarized light and the like. Moreover, a picture that is merely drawn on a paper is allowed. In this case, however, the polarizing direction should vary per display area of each picture, so as to allow the mixed picture to be taken out for display.

In FIG. 1, each slant line represents one example of the polarizing direction. For the picture separating mechanism E, the following three methods and the like are used: Method 1. two linearly polarized lights intersecting orthogonally with each other. Method 2. circularly polarized light. Method 3. liquid crystal shutter for periodically switching the two linearly polarized lights and the circularly polarized light.

The displayed mixed picture is copied on each of the mirrors M in a predetermined position for each area. Preferably, the mirror M is so set that the viewer can see, on the mirror M, only a required area of the picture that is separated for display. The mirrors M are ordinarily set in an upper position, a lower position, a right position and a left position of the display device. The positioning of the mirror M is, however, not limited to this. More specifically, the minimum requirement for positioning the mirror M is to allow the viewer to view the required area (of the display screen) copied on the mirror M. In other words, positioning of the mirror M (including the number of positions and the like) is not specifically restricted. The display surface is extended, for display, only by the number of mirrors M. Each of the mirrors M is merely an ordinary mirror. The mirror M is, however, replaceable by an optical element such as lens, prism and the like. When put between the picture separating mechanisms E, the optical element should not disorder the picture separating mechanisms E. The ordinary mirror with the odd number of reflections reverses the picture and the polarizing direction.

On the other hand, no reverse of the picture or the polarized light is caused in the following two cases: 1. Viewing the mirror M with the even number of reflections. 2. Viewing the light, as it is, from the display surface. Details of the picture separating function are to be described afterward in the latter mode for carrying out the invention. The viewer views the thus separated pictures by way of the picture separating mechanism E such as polarizer. Thereby, the viewer is allowed to view different pictures, that is, a picture A, a picture B, a picture C and a picture D, which four pictures are discretely taken out of respective areas.

FIG. 2 to FIG. 4 show the first mode for carrying out the invention. In FIG. 2, the linearly polarized lights of the display surface intersect orthogonally with each other. In FIG. 3 and FIG. 4, the mirrors are disposed on the right and the left. Each slant line represents one example of the polarizing direction. FIG. 2 shows a detailed drawing of the mixed picture of the display surface. FIG. 3 shows a top view of the first mode for carrying out the invention. FIG. 4 shows a schematic constitution (perspective view).

A separation area of the mixed picture display part (display surface 20) according to the first mode for carrying out the invention is constituted of a first divided area S-I, a second divided area S-II, and a third divided area S-III. The display screen is separated in a form of a sidewise band. The first divided area S-I is disposed in one area of the band. The second divided area S-II and the third divided area S-III are disposed in the other area of the band. The second divided area S-II is disposed on the left-half side, while the third divided area S-III is disposed on the right-half side. The optical means (mirror) are disposed on a right side and a left side of the display surface 20, respectively, at a predetermined angle θ1 and a predetermined angle θ2 relative to the display surface 20.

FIG. 2 shows a picture separating mechanism having the following polarizing directions each of which is indicated with a slant line: 1. The first divided area S-I of the display surface 20 has a polarized light which is 45° leftward upward relative to the sidewise (horizontal) direction. 2. Each of the second divided area S-II and the third divided area S-III of the display surface 20 has a polarized light which is 45° rightward upward relative to the sidewise (horizontal) direction. The linearly polarized lights intersect orthogonally with each other per line of a pixel.

The display surface 20 described in the above paragraph is developed in one of the following manners and the like: 1. Adhere a first polarizing plate (to a first line), followed by a second polarizing plate (to a second line) having a polarizing direction intersecting orthogonally with that of the first polarizing plate. 2. Adhere a polarizing plate having one polarizing direction (viewed from the viewer) on an entire surface of the display surface 20. Then, adhere a half wavelength plate to each line. 3. Otherwise, a circularly polarized light is allowed for the separation of the picture. In this case, the above rightward upward polarized light should be replaced with a rightward circularly polarized light, while the above leftward upward polarized light should be replaced with a leftward circularly polarized light.

In this mode for carrying out the invention, the arrangement of varying lines (alternate polarizing directions) is described for the following reason: When transmitting a picture signal, it is convenient to use a video signal of each of a first picture, a second picture and a third picture for one signal per field of the interlace. Configuration of the picture separating mechanism is, however, not restricted, provided that each picture is copied per a target divided area. More specifically, other types of configuration are allowed such as mottling, check and the like.

In the first divided area S-I, the picture projected as the mixed picture displays a picture ("A" in FIG. 4) which is projected on a front side of the display surface. Moreover, in the second divided area S-II, the picture projected as the mixed picture displays, with right and left reversed, a picture ("B" in FIG. 4) which is projected on a left side of the picture, while in the third divided area S-III, the picture projected as the mixed picture displays, with right and left reversed, a picture ("C" in FIG. 4) which is projected on a right side of the picture.

FIG. 3 shows positioning of the mirrors and the viewer. The mirrors are disposed leftward and rightward relative to the display surface in a condition that the viewer views from the front surface. In FIG. 3, a first mirror 31 copies a picture on the left side, while a second mirror 32 copies a picture on the right side. In this mode of carrying out the invention, the first mirror 31 on the left and the second mirror 32 on the right are equal in scale. The mixed picture area of each of the first mirror 31 and the second mirror 32 is copied to a center of the display surface 20. The first mirror 31 (left) and the second mirror 32 (right) are, however, variable in scale in accordance with an angle of the picture to be displayed. In FIG. 3, there are shown a virtual screen V1 and a virtual screen V2.

More specifically, when the ratio is a : b, the following assumptions are made: The display surface 20 in FIG. 2 is defined as 2H in scale. Lateral length of the second divided area S-II is defined as $2aH/(a+b)$, while lateral length of the third divided area S-III is defined as $2bH/(a+b)$. In accordance with these, the first mirror 31 is defined as $2aH/(a+b)$ in scale, while the second mirror 32 is defined as $2bH/(a+b)$ in scale.

FIG. 4 shows the display device thus constituted which is viewed by a viewer. The first mirror 31 copies a reversed picture of the left side of the display surface 20, with the polarizing direction reversed. The second mirror 32 copies a reversed picture of the right side of the display surface 20, with the polarizing direction reversed. When the viewer I views through a picture separating mechanism 40 (for example, a polarizing plate having the polarizing direction same as that of the first divided area S-I), what is viewed on the mixed display surface is only the picture having the polarizing direction same as that of the first divided area S-I shown in FIG. 2. The projected picture ("A" in FIG. 4) is viewed on the front surface.

The polarizing direction is reversed with the first mirror 31 and the second mirror 32. Thereby, the polarizing direction of the first divided area S-I is perpendicular to the polarizing direction of the picture separating mechanism 40 on the viewer's side. What is viewed is only the light having the polarizing direction of the respective second divided area S-II and the third divided area S-Ill shown in FIG. 2, to thereby project the picture on the left ("B" in FIG. 4) and the picture on the right ("C" in FIG. 4). As a result, the viewer I views a large screen extending rightward and leftward from the display surface 20, as is seen in FIG. 4. In the case of using the circularly polarized light for the picture separation, rotation of the circularly polarized light is reversed with the first mirror 31 and the second mirror 32. Therefore, use of the circularly polarized light having the direction same as that of the first divided area S-I is a must for the picture separating mechanism 40 in FIG. 4.

FIG. 5 and FIG. 6 show the second mode for carrying out the invention, extending freely the display surface upward and downward. FIG. 5 shows a detail of the mixed picture of the display surface. A separation area of the mixed picture display part (display surface 20) according to the second mode for carrying out the invention is constituted of a first divided area S-I, a second divided area S-II, and a third divided area S-III. The display screen is separated in a form of a sidewise band. The first divided area S-I is disposed in one area of the band. The second divided area S-II and the third divided area S-III are disposed in the other area of the band. The second divided area S-II is disposed on the upper side, while the third divided area S-III is disposed on the lower side. The optical means (mirror) are disposed on an upper side and a lower side of the display surface 20 at predetermined angles, respectively, relative to the display surface 20.

According to the second mode for carrying out the invention, the polarizing direction of the first divided area S-I is so constituted as to intersect orthogonally with the polarizing direction of the second divided area S-II and the third divided area S-III, like the first mode for carrying out the invention in FIG. 2. In FIG. 5, each slant line represents one example of the polarizing direction, thus providing a picture separating mechanism having the polarizing direction of the slant line.

Like the first mode for carrying out the invention, the second mode for carrying out the invention is allowed to use the circularly polarized light, instead of the linearly polarized light. The second divided area S-II at an upper part of the display surface displays a picture to be projected on the upper part of the display surface, while the third divided area S-III at a lower part of the display surface displays the picture to be projected on the lower part of the display surface. FIG. 6 shows an entire constitution of the second mode for carrying out the invention. The second mode for carrying out the invention is the same as the first mode for carrying out the invention, excluding the following point: On a side of the viewer I, there is provided a picture separating mechanism 50 having the polarizing direction shown in FIG. 6. 2; and a third mirror 33 is disposed at the upper part of the display surface 20, while a fourth mirror 34 is disposed at the lower part of the display surface 20.

FIG. 7 shows the third mode for carrying out the invention, extending freely the display surface upward, downward, rightward, and leftward. A separation area of the mixed picture display part (display surface 20) according to the third mode for carrying out the invention is constituted of a first divided area S-I, a second divided area S-II, a third divided area S-III, a fourth divided area S-IV, and a fifth divided area S-V. The display screen is separated in a form of a sidewise band. The first divided area S-I is disposed in one area of the band. The second divided area S-II and the third divided area S-III are disposed in the other area of the band. The second divided area S-II is disposed on the left-half side longitudinally, while the third divided area S-III is disposed on the right-half side longitudinally. The fourth divided area S-IV constitutes one longitudinal end of the second divided area S-II and the third divided area S-III, while the fifth divided area S-V constitutes the other longitudinal end of the second divided area S-II and the third divided area S-III. The optical means (mirror) are disposed on the right side, left side, upper side and lower side of the display surface 20, respectively, at predetermined angles relative to the display surface 20.

Figure 7A:
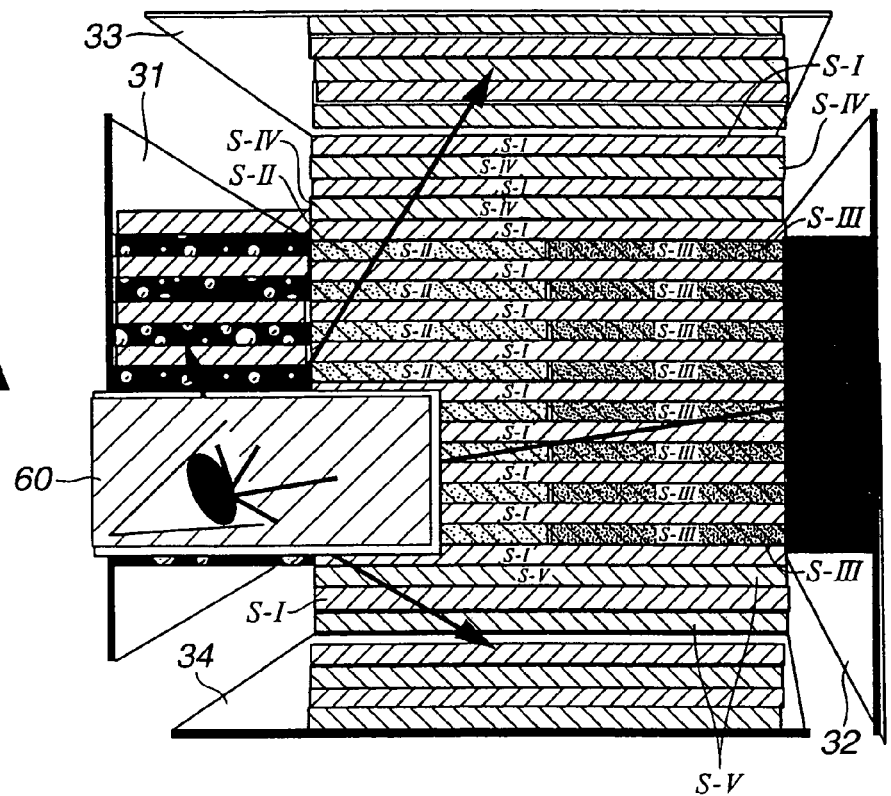
FIG. 7A is a perspective view of a constitution.

In FIG. 7A, each slant line represents one example of the polarizing direction, thus providing a picture separating mechanism having the polarizing direction of the slant line. As is seen in FIG. 7A, the first mode for carrying out the invention is applied to a longitudinally center area of the display surface 20. More specifically, there are provided the first mirror 31 and the second mirror 32 which are so adjusted in scale and angle as to display the mixed picture (left picture, right picture, and front picture), in addition, as to copy the thus displayed area only.

Figure 7B:
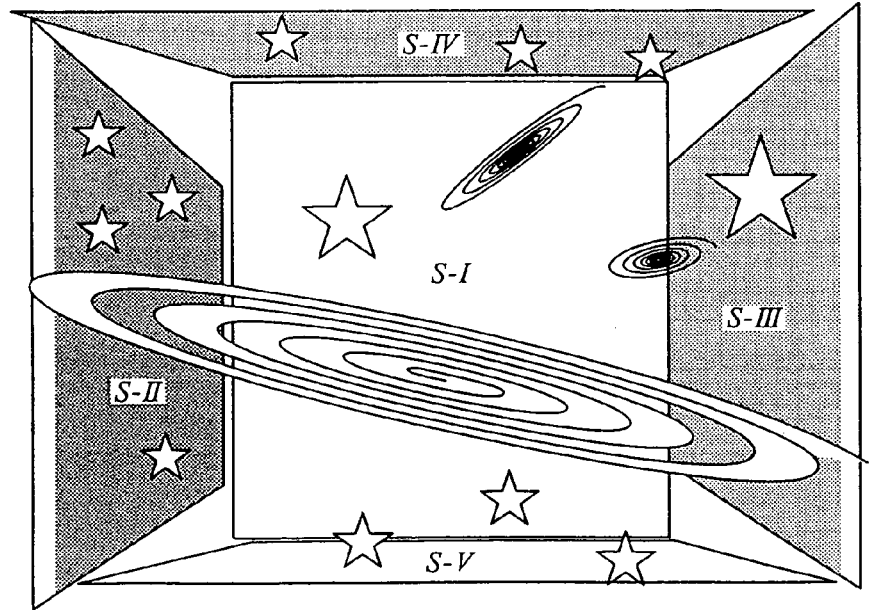
FIG. 7B is an explanatory drawing showing the display screen.

The second mode for carrying out the invention is applied to the other area (upper part and lower part) of the display surface 20. More specifically, there are provided the third mirror 33 and the fourth mirror 34 which are adjusted in scale and angle. The thus adjusted third mirror 33 displays the mixed picture (upper picture) at the upper part of the display surface, while the thus adjusted fourth mirror 34 displays the mixed picture (lower picture) at the lower part of the display surface. In addition, the thus adjusted fourth mirror 33 and the fifth mirror 34 copy the thus displayed area only. Moreover, providing a picture separating mechanism 60 (having the polarizing direction shown in FIG. 7A) on the viewer's side allows the viewer to view the picture extending freely upward, downward, rightward, and leftward relative to the display surface, as is seen in FIG. 7B.

Figure 8:
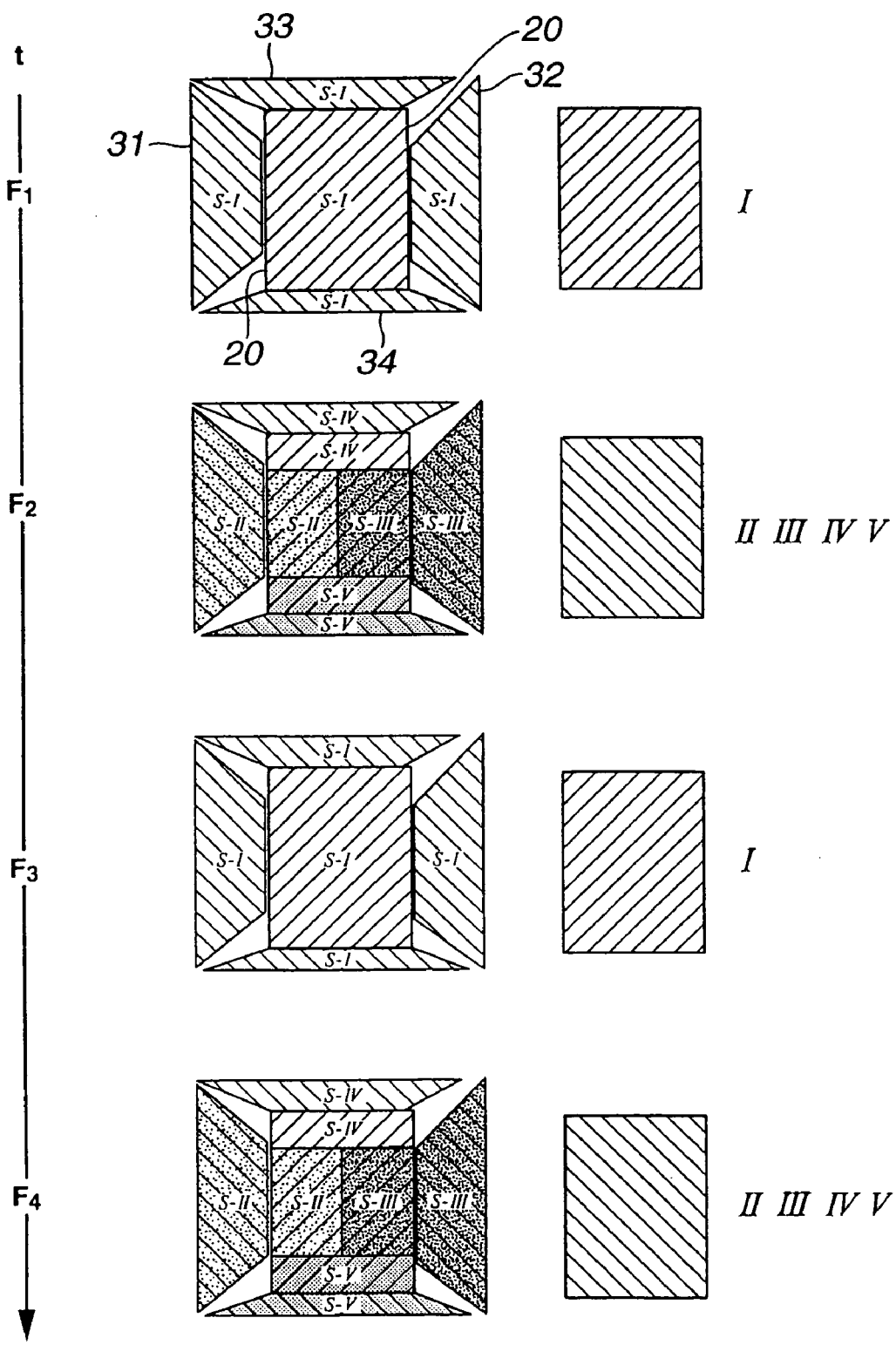
FIG. 8 is a constitution, according to a fourth mode for carrying out the invention.
Figure 9:
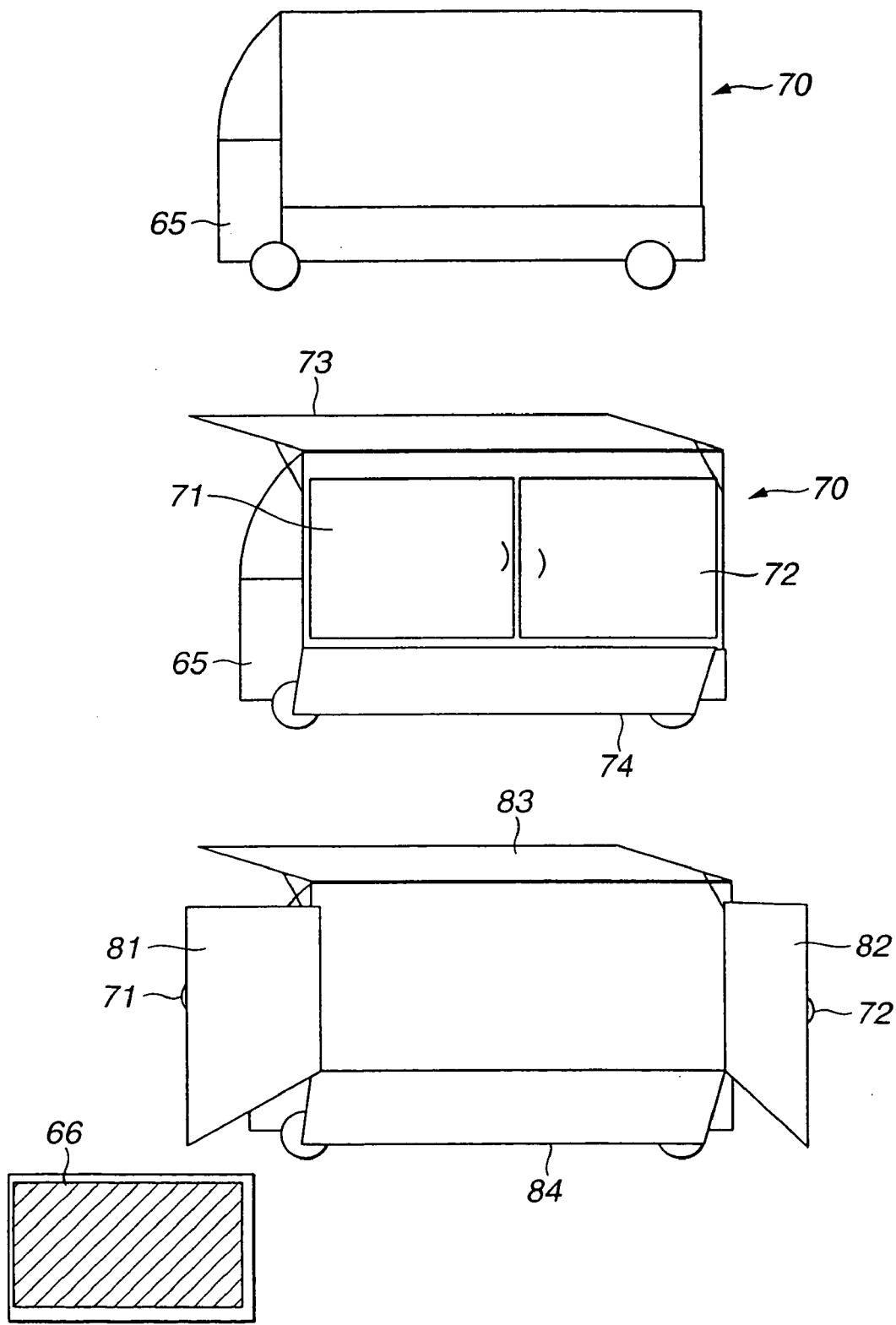
FIG. 9 is a constitution, according to a fifth mode for carrying out the invention.

FIG. 8 shows the fourth mode for carrying out the invention, varying the display picture of the mixed picture in accordance with elapsed time. In FIG. 8, there are shown sequentially from the left as follows: 1. elapsed time t. 2. display surface of display device, displayed picture, and mirror constitution. 3. polarizing direction of the picture separating mechanism. 4. displayed picture. Like the first mode for carrying out the invention, the second mode for carrying out the invention, and the third mode for carrying out the invention, each of the first mirror 31, the second mirror 32, the third mirror 33, and the fourth mirror 34 is so adjusted as to copy the picture of only one of the respective areas.

In FIG. 8, each slant line represents one example of the polarizing direction. According to the fourth mode for carrying out the invention, the polarized light is not arranged per line, unlike the first mode for carrying out the invention, the second mode for carrying out the invention, and the third mode for carrying out the invention. Instead, according to the fourth mode for carrying out the invention, the linearly polarized light having one polarizing direction is used for the entire area of the display surface 20. For example, the linearly polarized light directs only rightward upward relative to sidewise direction. Practically, the polarizing plate is attached to the entire area of the display surface 20.

In FIG. 8, the first divided area S-I, the second divided area S-II, the third divided area S-III, the fourth divided area S-IV, and the fifth divided area S-V represent, respectively, the videos projected on front, left, right, upper, and lower parts of the display surface. The second divided area S-II, the third divided area S-III, the fourth divided area S-IV, and the fifth divided area S-V in FIG. 8 correspond, respectively, to the second divided area S-II, the third divided area S-III, the fourth divided area S-IV, and the fifth divided area S-V in FIG. 7.

During a period defined by a first field F1, the first divided area S-I is projected. Viewing through the picture separating mechanism having the rightward upward polarizing light, the viewer views the first section S-I on the front area of the display surface 20. Nothing is viewed on the first mirror 31 (left), the second mirror 32 (right), the third mirror 33 (upper), and the fourth mirror 34 (lower).

Next, during a period defined by a second field F2, the second divided area S-II, the third divided area S-III, the fourth divided area S-IV, and the fifth divided area S-V are displayed, respectively, at the left part, the right part, the upper part, and the lower part of the display surface 20. The picture separating mechanism synchronously operates with this in such a manner as to cause a leftward upward polarizing light. The viewer views the display device by means of the thus operating picture separating mechanism. Nothing is viewed on the front area of the display surface 20. The viewer views the second divided area S-II, the third divided area S-III, the fourth divided area S-IV, and the fifth divided area S-V, respectively, on the left, right, upper, and lower parts of the display surface 20.

Moreover, during a period defined by a third field F3 and a fourth field F4, the above operation is repeated at high speed, for example not less than 30 Hz. With this, the viewer views the picture of the first divided area S-I at the center of the picture, and the pictures of the respective second divided area S-II, third divided area S-III, fourth divided area S-IV, and fifth divided area S-V.

The above operating condition during the periods defined by the first field F1, the second field F2, the third field F3, and the fourth field F4 is just for example, and therefore, not limited to the above. In addition, the circularly polarized light is applicable in place of the polarized light. For obtaining the circularly polarized light, a ¼ wavelength plate is disposed on the polarizing plate. In this case, however, a shutter for switching the circularly polarized light (rightward, leftward) is used for the picture separating mechanism.

FIG. 9 shows the fifth mode for carrying out the invention, in which the display device according to the modes for carrying out the invention in FIG. 2 to FIG. 7 is so constituted as to move, and the optical means (mirror) is provided with a door mechanism for opening and closing. In FIG. 9, there are provided a picture separating mechanism 66 on the viewer side, and a movable display device 70 on a movable bench 65.

The display device under the present invention is provided with the mirror around the display surface. According to the fifth mode for carrying out the invention, however, the mirror is so made as to open and close upward, downward, rightward, and leftward. More specifically, there are provided a mirror 81, a mirror 82, a mirror 83, and a mirror 84 which are disposed on back sides of respective biparting doors, that is, a biparting door 71, a biparting door 72, a biparting door 73, and a biparting door 74. With the biparting door 71, the biparting door 72, the biparting door 73, and the biparting door 74 closed when the display device is not used, the mirror 81, the mirror 82, the mirror 83, the mirror 84, and the display surface are kept free of contamination and dust. In addition, arrangement of the mirrors is easy during display.

Described hereinafter is a first mode for carrying out the invention by a multi-picture simultaneous display method. With the constitutions in FIG. 2 to FIG. 7, and FIG. 9, the plurality of pieces of video information are assigned, for display purpose, to the plurality of respective divided areas (of the display screen) which are divided by the rules. At least one of the plurality of the pictures thus separated and displayed on the display screen is displayed on the plurality of optical means disposed each of which is disposed at the end of the display screen. Thereby, the viewer views, by means of the picture separating means, the picture displayed on the display screen and the picture displayed on the plurality of the optical means.

Described hereinafter is a second mode for carrying out the invention by the multi-picture simultaneous display method. With the constitutions in FIG. 8 and FIG. 9, of the plurality of pieces of video information, the first display mode displays one piece of video information on the entire area of the display screen, while the second display mode assigns, for display purpose, the other pieces of video information to the plurality of respective divided areas (of the display screen) which are divided by the rules. The first display mode and the second display mode are switchably displayed per field. Thereby, the viewer views, by means of the picture separating means, the picture displayed on the display screen and the picture displayed on the plurality of the optical means. Herein, the picture separating means is the one that can switch the picture displayed on the display screen and the picture displayed on the plurality of the optical means synchronously with the first display mode and the second display mode.

Described hereinafter are constitutions of other modes for carrying out the invention.

More specifically, the video to be displayed on the multi-picture display device is disposed in such a manner that the picture is displayed continuously on screens which are separated adjacently. Moreover, each of the devices is disposed plural in number, so that the viewer can see multi-picture simultaneously. Furthermore, each of the devices is disposed for both eyes of the viewer so that the viewer can achieve a binocular vision.

Moreover, the optical means is not limited to the mirror. In other words, any other optical means meeting a minimum requirement for the same function is allowed.

As described above, according to the multi-picture simultaneous display device and the multi-picture simultaneous display method under the present invention, the mixed picture generated from the plurality of pictures is displayed and viewed without being fragmented into small pieces like when the multi-window method is used. For example, the viewer can view five screens simultaneously with the pictures appearing upward, downward, rightward, and leftward. In addition, the larger the number of optical means is, the larger the number of pictures is. Moreover, a multi-picture display and the panoramic large screen are also available. Still furthermore, in the case of the movable display device, the display device is provided with the door for dust proof during movement and storage. The door is also used as mirror (optical means), thus causing no waste.

Described hereinafter are other modes for carrying out the invention concerning the multi-picture simultaneous display method. Also described hereinafter is a mode for carrying out the invention concerning a video signal generator, and a mode for carrying out the invention concerning a recording medium.

Figure 30:
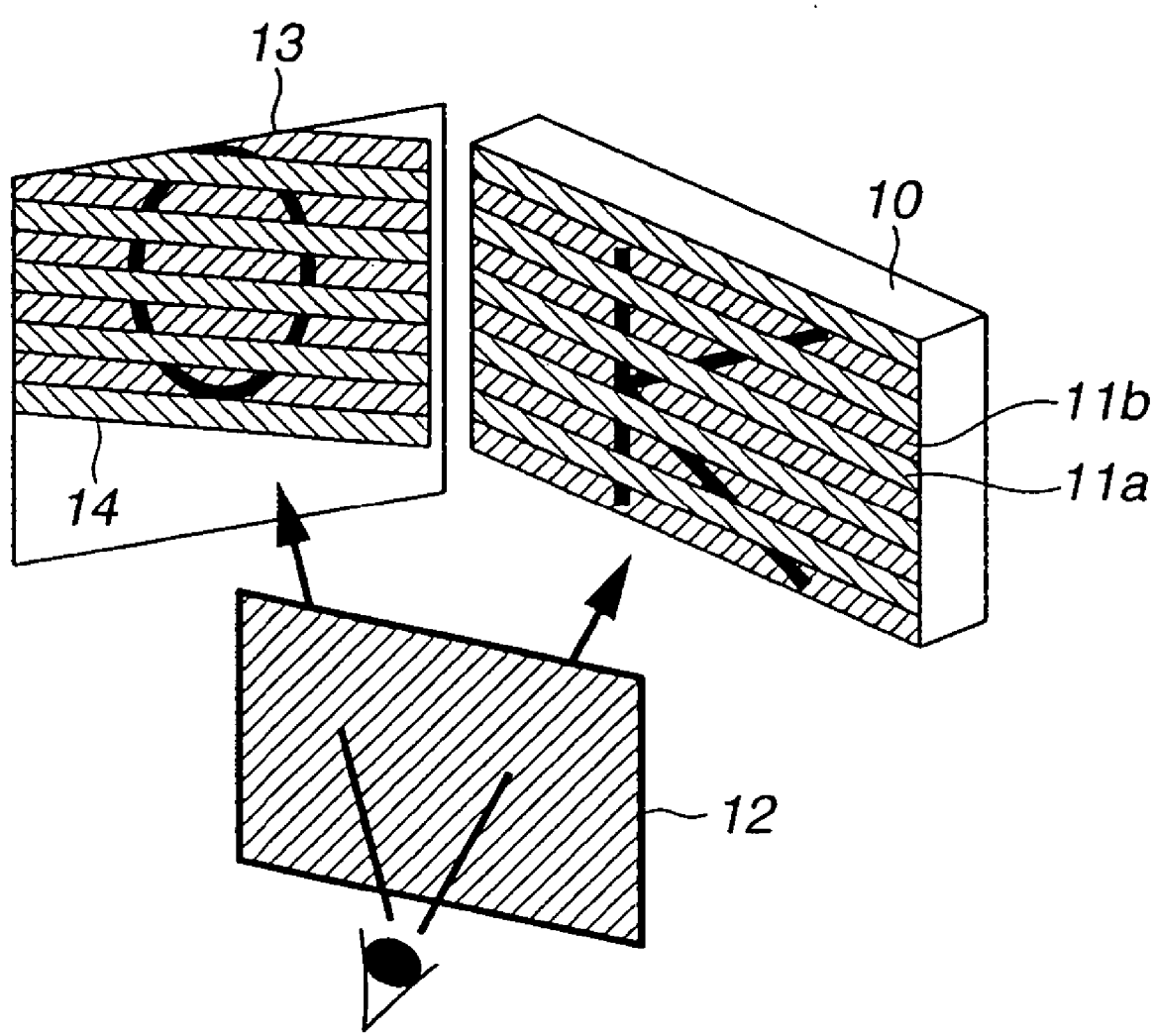
FIG. 30 is a constitution of a display device separating two pictures with a mirror, according to a conventional art.

FIG. 10, FIG. 11, FIG. 12, and FIG. 13 show the mixed picture display screen on which the plurality of pieces of the video information are assigned, for display purpose, to respective divided areas. For example, FIG. 10, FIG. 11, FIG. 12, and FIG. 13 show the liquid crystal display screen 10 of the display device in FIG. 30 and FIG. 31.

Figure 10:
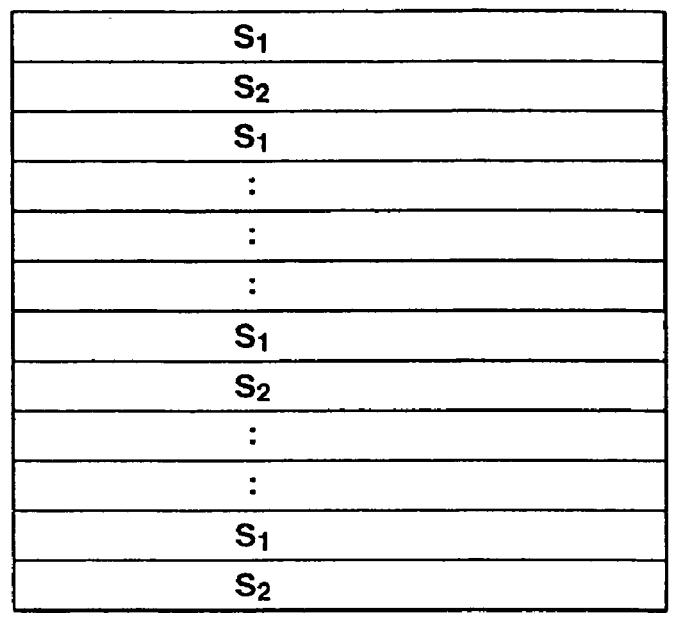
FIG. 10 is the mode for carrying out the invention, showing a constitution of a first nest (sidewise line separation) of a multi-picture display video information.
Figure 11:
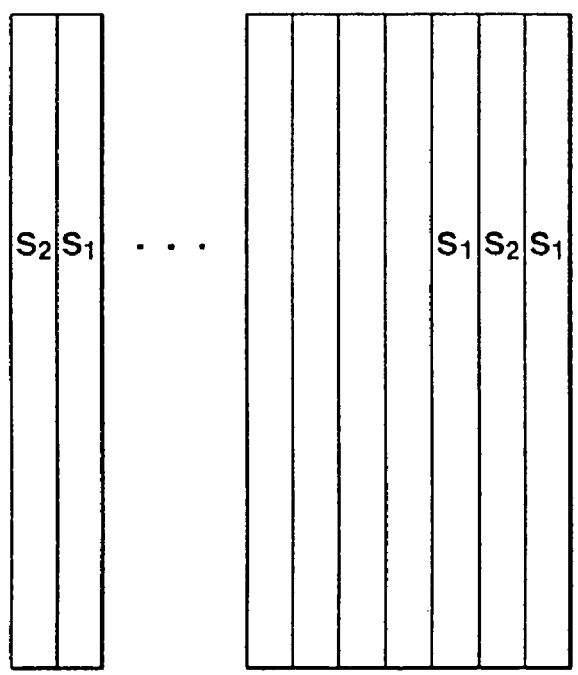
FIG. 11 is the mode for carrying out the invention, showing a constitution of a second nest (lengthwise line separation) of the multi-picture display video information.
Figures 12, 13:
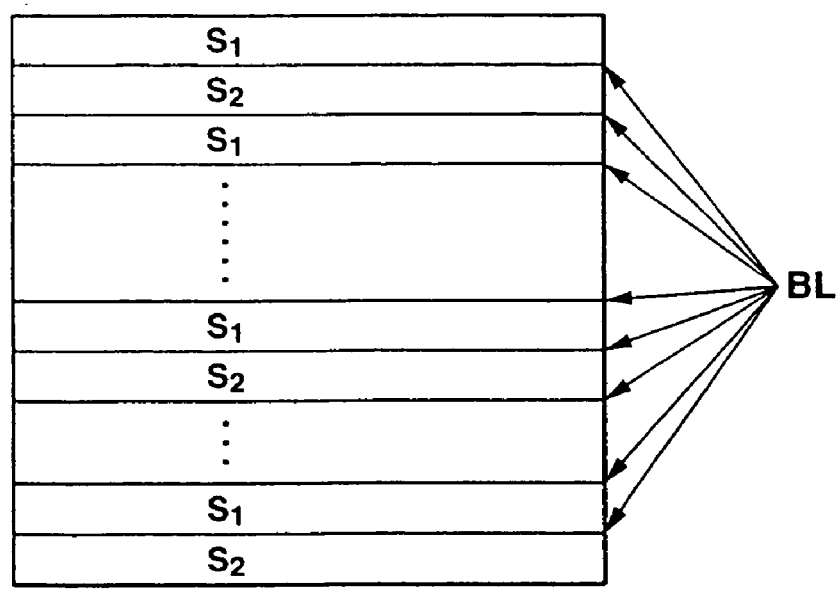
FIG. 12 is the mode for carrying out the invention, showing a constitution of a third nest (checkerwise) of the multi-picture display video information.
FIG. 13 is the mode for carrying out the invention, showing signals for reducing crosstalk of the multi-picture display video information.

FIG. 10 shows the display screen separated into sidewise bands. In FIG. 10, a first picture display section S1 and a second picture display section S2 constitute alternate nests. FIG. 11 shows the display screen separated into lengthwise bands. In FIG. 11, the first picture display section S1 and the second picture display section S2 constitute alternate nests. FIG. 12 shows the display screen separated into a plurality of rectangular sections. In FIG. 12, the first picture display section 1 and the second picture display section 2 constitute checkerwise nests.

Moreover, FIG. 13 shows the display screen separated into sidewise bands. In FIG. 13, the first picture display section S1 and the second picture display section S2 constitute alternate nests, adding a black information BL to a boundary of each of the pictures. The above addition of the black information BL to the boundary of each of the pictures is also applicable to the display screen in FIG. 11 and FIG. 12.

The thus constituted multi-picture display video information is inputted (for display purpose) into the display device having a first picture display screen and a second picture display screen forming a predetermined angle. Included in such display devices is, for example, the one shown in FIG. 30 and FIG. 31. Moreover, the constitution of the video information is allowed to be such that, by adding one more mirror to the display device, three pictures are sequentially made into nests as video information corresponding to three screens, that is, upper-center-lower, and left-center-right.

Displaying the display device with the thus constituted multi-picture display video information allows reduction of the crosstalk between pictures. The reduction of the crosstalk is attributable to the black information BL added to the boundary between the divided areas.

Herein, the above "video information constituting nest" is described, for example, as follows: Data on scanning lines are disposed alternately so that different pictures are displayed corresponding to respective display positions of two types of polarizing plates which are disposed on the liquid crystal display screen 10 of the display device in FIG. 30.

Figure 15A:
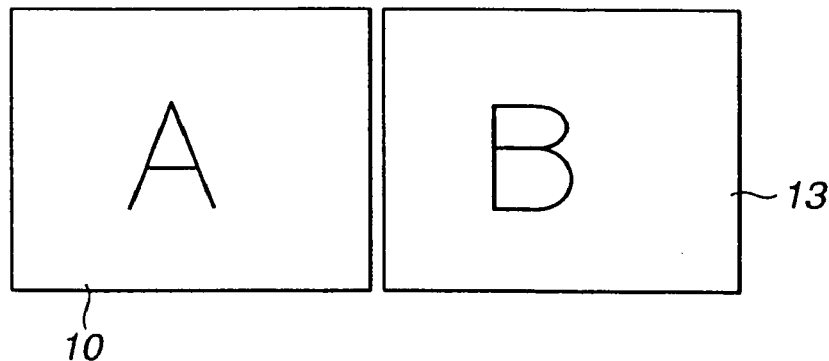
FIG. 15 is the mode for carrying out the invention, explaining the constitution of the multi-picture display video information.
Figure 15B:
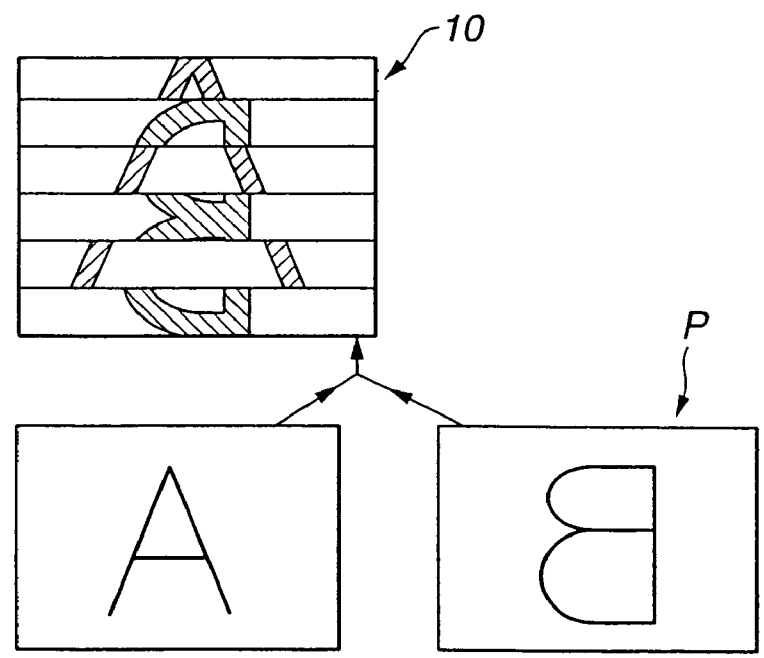

An example is shown in FIG. 15. How to display "A" on the liquid crystal display screen 10 and "B" on the mirror 13 is described as follows: 1. Separate the liquid crystal display screen 10 (for displaying mixed picture), for example, into a plurality of sideward sections. 2. Assign (for display purpose) data on "A" and data on "B" alternately to the thus separated respective sections. Herein, the data on "B" to be copied on the mirror 13 is inputted into the liquid crystal display screen 10 with a reverse arrangement. In FIG. 15B, there is shown an original picture P that is to be disposed on the mirror side.

Described hereinafter referring to FIG. 14 is a systematic constitution for generating the muiti-picture display video information as described referring to above FIG. 10, FIG. 11, FIG. 12 and FIG. 13. A first video signal VS1 and a second video signal VS2 are digitized into information by means of, respectively, a digitizer 91 and a digitizer 92, and then are temporarily stored, respectively, in a picture memory 93 and a picture memory 94. The thus stored data is converted into the above "video information constituting nest" by means of a two-screen display video signal converter 95.

More specifically, the two-screen display video signal converter 95 makes the reverse arrangement described in the following one sentence: Of the first video signal VS1 and the second video signal VS2, the data on the mirror side shows a reversed display. Moreover, the video signal converter 95 alternately assigns, by a predetermined rule, the first video signal VS1 and the second video signal VS2 to the respective divided areas (picture display area) which are divided as shown in FIG. 10, FIG. 11, FIG. 12 and FIG. 13. As a result, the multi-picture display video information is generated which constitutes nest.

Then, the multi-picture display video information is stored in a picture memory 96. Then, inputting the multi-picture display video information into a two-screen picture display device 97 such as the one described in the conventional art (for example, the device in FIG. 30 and FIG. 31) allows the viewer to view a desired two-screen video. In addition, inputting the multi-picture display video information into a recording device 98 allows recordation and storage thereof in a recording medium 99 (such as an optical disk, a magnetic tape, and the like).

The video information inputted into the digitizer 91 and the digitizer 92 includes: the one that is shot with a video camera, broadcasted, recorded in a disk or a tape, developed with a personal computer, and the like. Also included in the video information is the one that is a mixture of the above.

According to the modes for carrying out the invention hereinabove, the picture for two-screen is described. The mode for carrying out the invention is, however, not limited thereto. For example, the mode for carrying out the invention is applicable to a three-screen opening from center to rightward and leftward, a three-screen opening from center to upward and downward, and a five-screen opening from center to upward, downward, rightward, and leftward. In these examples, the mode for carrying out the invention presents operation and effect same as those of the above described.

Under the present invention, the viewer can view a high quality two-screen picture free of crosstalk. Furthermore, the viewer can obtain the same effect in the case of three or more screens.

Described hereinafter are modes for carrying out the invention applied to a two-screen display video information generating system. The two-screen display video information generating system generates video information to be displayed on the display device having two picture display screens.

For a first mode for carrying out the invention, refer to FIG. 16 to FIG. 21. For a second mode for carrying out the invention, refer to FIG. 22 to FIG. 24. For a third mode for carrying out the invention, refer to FIG. 25 and FIG. 26. For a fourth mode for carrying out the invention, refer to FIG. 27 to FIG. 29.

First Mode for Carrying Out the Invention:

The first mode for carrying out the invention is concerning a video information displayed on a display device having a first display screen and a second display screen forming therebetween a predetermined angle θ (for example, the first display screen is a liquid crystal, while the second display screen is a mirror). On the first display screen, an original video information generates the video information constituting nest; while on the second display screen, a processed video information (of the original video information) generates the video information constituting nest.

Figure 16A:
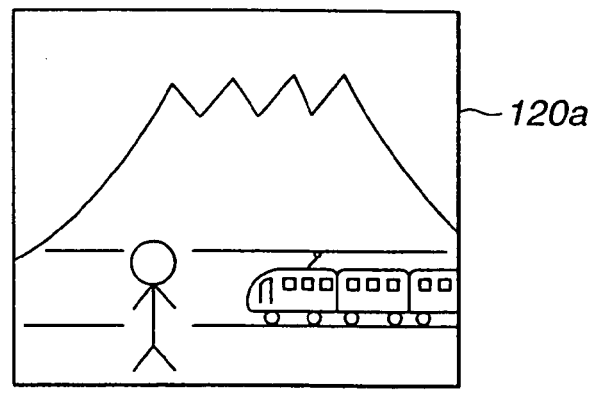
FIG. 16A is an explanatory drawing of an original video.
Figure 16B:
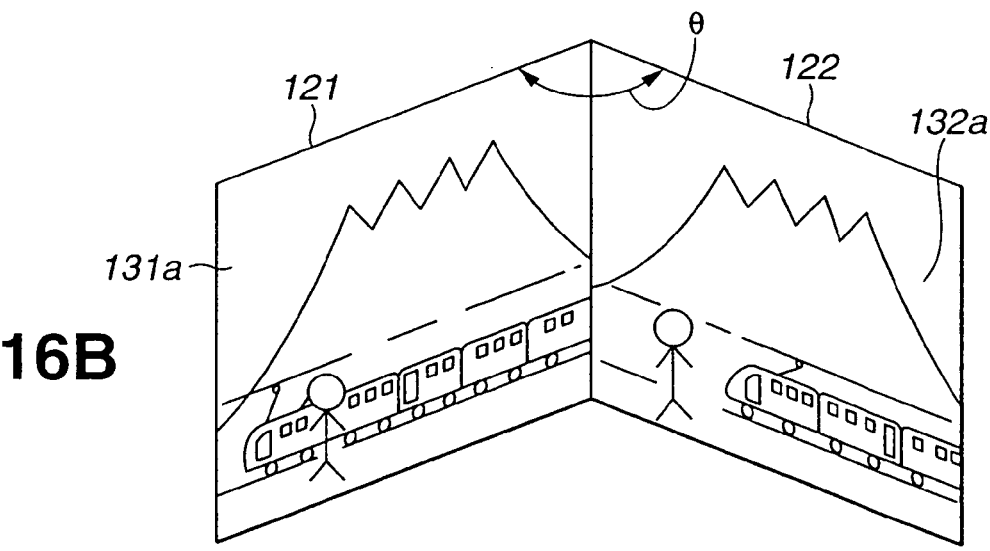
FIG. 16B is a perspective view of a two-screen having a second display screen video information (static picture)

FIG. 16 shows a second display screen video information as a static picture. FIG. 16A shows an original video 20a, while FIG. 16B shows an example of display on a two-screen display device. The first display screen 121 displays an original picture in a dynamic picture 131a, while the second display screen 122 projects a static picture 132a. The static picture 132a is a video (dynamic picture 131a) projected on the first display screen 121, and is taken in at a predetermined timing. The two-screen display video information in FIG. 16 is generated with a two-screen display video information generating system (to be described afterward).

Herein, the above "video signal constituting nest" is described as follows: Data on scanning lines are disposed alternately so that different pictures are displayed correspondingly to respective display positions of two types of polarizing plates which are disposed on the first display screen 121.

Figure 17A:
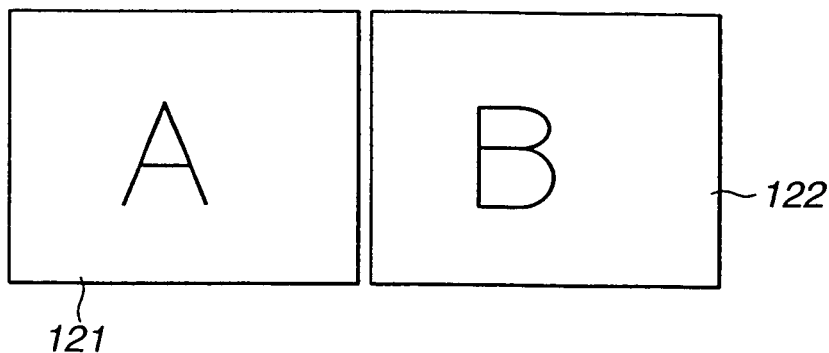
FIG. 17 is the first mode for carrying out the invention, explaining a constitution of a two-screen display video information.
Figure 17B:
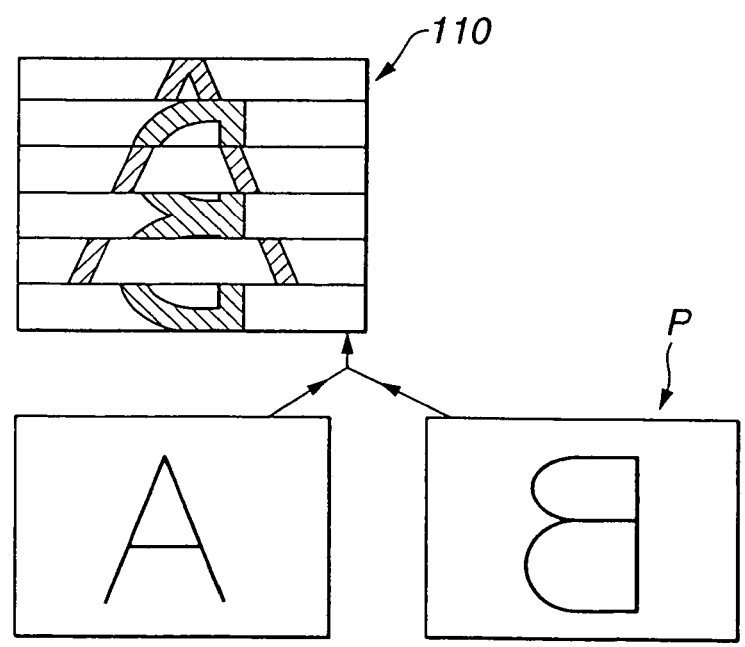

An example is shown in FIG. 17. How to display the "A" on the first display screen 121 and "B" on the second display screen 122 is described as follows: 1. Separate a display screen 110 (liquid crystal for displaying mixed picture) into, for example, a plurality of sidewise sections. 2. Assign (for display purpose) data on "A" and data on "B" alternately to the thus separated respective sections. Herein, the data on "B" to be copied on the second display screen 122 (namely, the mirror) is displayed on the display screen 110 with a reverse arrangement. Other than the sideward separation, separation of the display screen 110 includes lengthwise separation, checkerwise separation, and the like. In FIG. 17B, there is shown an original picture P that is to be disposed on the mirror side.

Figure 18A:
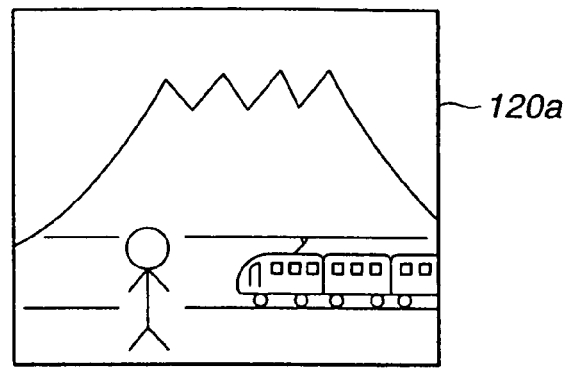
FIG. 18A is the explanatory drawing of the original video.
Figure 18B:
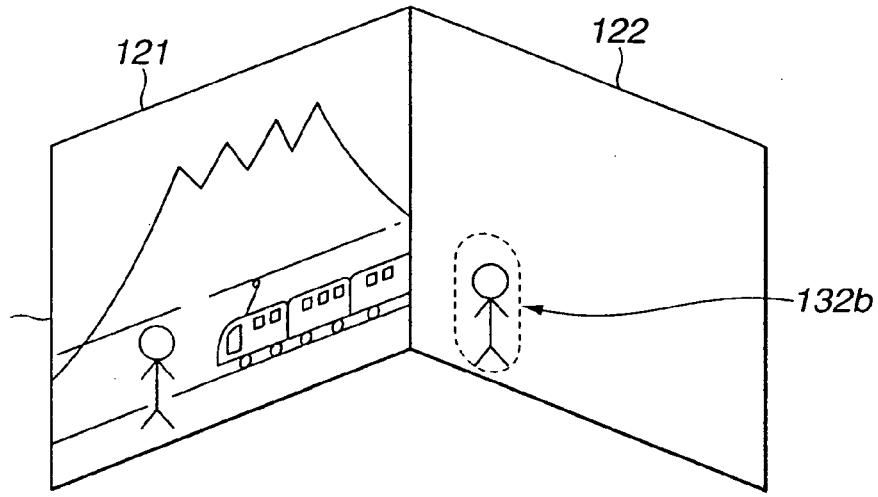
FIG. 18B is a perspective view of the two-screen having the second display screen video information (extraction picture)
Figure 18C:
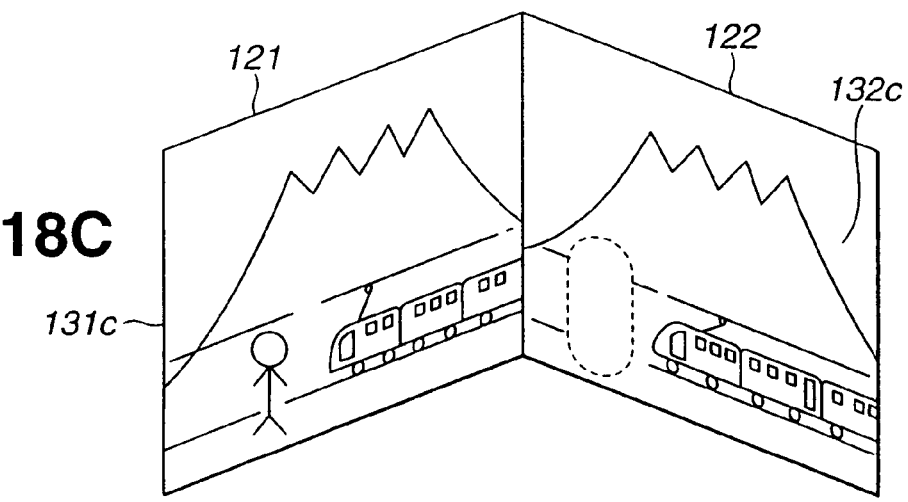
FIG. 18C is a perspective view of the two-screen having the second display screen video information (deletion picture)

In FIG. 18, a specific object is extracted to or deleted from the second display screen video information. FIG. 18A shows the original video 120a. FIG. 18B and FIG. 18C show examples of display on the two-screen display device.

In FIG. 18B, the first display screen 121 displays an original picture 131b. Moreover in FIG. 18B, the second display screen 122 displays an extraction picture 132b extracting the specific object (human) from the video (original picture 131b) projected on the first display screen 121.

In FIG. 18C, the first display screen 121 displays an original picture 131c. The second display screen 122 displays a deletion picture 132c deleting the specific object (human) from the video (original picture 131c) projected on the first display screen 121. Selecting the specific object and determining area are carried out freely with the two-screen display video information generating system (to be described afterward).

Figure 19A:
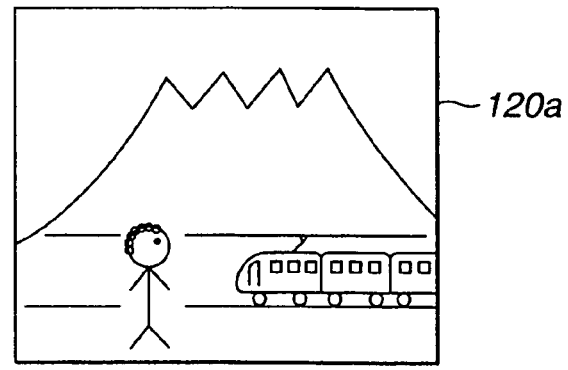
FIG. 19A is the explanatory drawing of the original video.
Figure 19B:
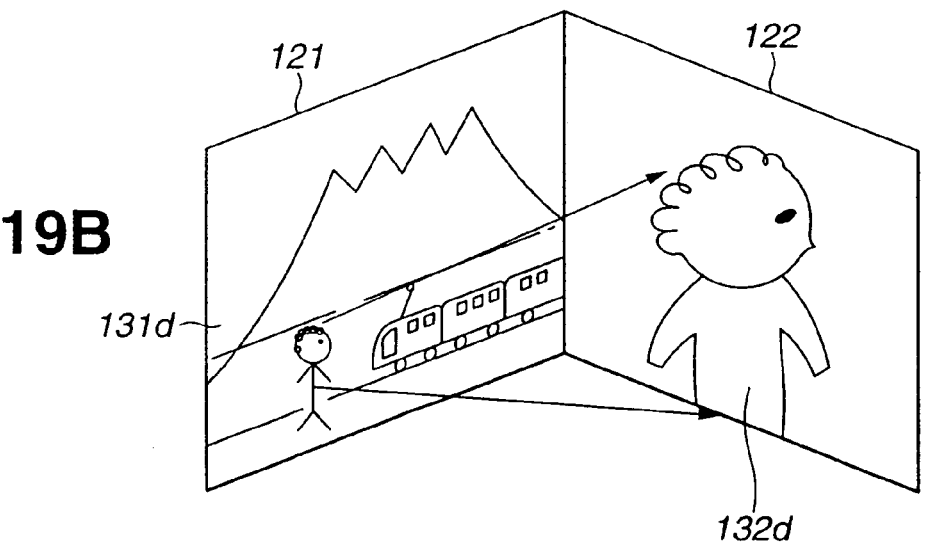
FIG. 19B is a perspective view of the two-screen having the second display screen video information (enlarged picture)

In FIG. 19, a specific section of the second display screen video information is enlarged. FIG. 19A shows the original video 20a. FIG. 19B shows an example of display on the two-screen display device. The first display screen 121 displays an original picture 131d. The second display screen 122 displays the video (original picture 131d) projected on the first display screen 121. The video (original picture 131d) is the one that is taken in in a selected area and enlarged by a predetermined magnification for display. Selecting the taken-in area and determining the magnification are carried out freely with the two-screen display video information generating system (to be described afterward).

Figure 20A:
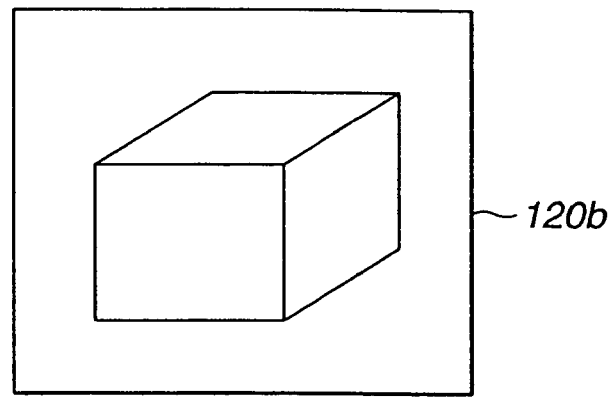
FIG. 20A is the explanatory drawing of the original video.
Figure 20B:
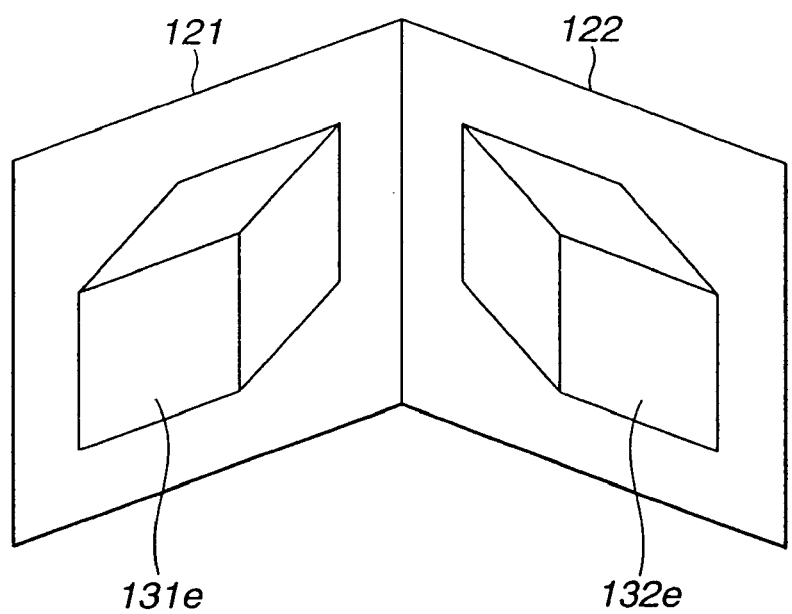
FIG. 20B is a perspective view of the two-screen having the second display screen video information (different viewpoint picture)

In FIG. 20, the second display screen video information shows a picture viewed from a different view point. FIG. 20A shows an original video 120b. FIG. 20B shows an example of display on the two-screen display device. The first display screen 121 displays an original picture 131e. The second display screen 122 displays a different view-point picture 132e. The different view-point picture 132e is the video (original picture 131e) projected on the first display screen 121, and is viewed from a different view point. Selecting an area of the picture viewed from the different view point and determining location of the different view point are carried out freely with the two-screen display video information generating system (to be described afterward).

Described hereinafter referring to FIG. 21 is a systematic constitution of the two-screen display video information generating system which is described in FIG. 16 to FIG. 20. At first, a video signal VS is converted into a digital data with a digitizer 141. Then, the thus converted digital data is stored in a picture memory 142. In a second picture generator 143, the digital data is converted into a second display screen data. Then, the digital data is stored in a subsequent picture memory 144.

The data stored in the picture memory 142 and the picture memory 144 are converted into the above described "video information constituting nest" by means of a two-screen display video signal converter 145. Namely, of the above described data, the two-screen display video signal converter 145 reverses a display of the second display screen data which is the data of the picture memory 144. Moreover, the two-screen display video signal converter 145 assigns the data (of the picture memory 142) and the data (of the picture memory 144) alternately to the respective divided areas (of the screen) divided by the predetermined rule, to thereby generate the two-screen display video information constituting nest.

Inputting the two-screen display video information into a two-screen picture display device 146 such as the one described in the conventional example (for example, the device in FIG. 30 and FIG. 31) allows the viewer to view a desired two-screen video. In addition, inputting the two-screen display video information into a recording device 147 allows recordation and storage thereof in a recording medium 148 such as an optical disk, a magnetic tape and the like.

The second picture generator 143 described above is so instructed from an operation input device 149 to generate a desired second screen video. More specifically, the desired second screen video includes the static picture 132a in FIG. 16, the extraction picture 132b in FIG. 18B, the deletion picture 132c in FIG. 18C, the enlarged picture 132d in FIG. 19, the different view-point picture 132e in FIG. 20, and the like.

As a matter of course, the two-screen display video information generating system is allowed to be constituted in such a manner that the second picture generator 143 has a single function with the operation input device 149 eliminated.

The video signal inputted into the digitizer 141 includes: the one that is shot with a video camera, broadcasted, recorded in a disk or a tape, and the like.

Second Mode for Carrying Out the Invention:

The second mode for carrying out the invention is concerning a video information displayed on a display device having a first display screen and a second display screen forming therebetween a predetermined angle θ (for example, the first display screen is a liquid crystal, while the second display screen is a mirror). On the first display screen, an original video information generates the video information constituting nest; while on the second display screen, a character information (relating to the original video information) generates the video information constituting nest.

Figure 22A:
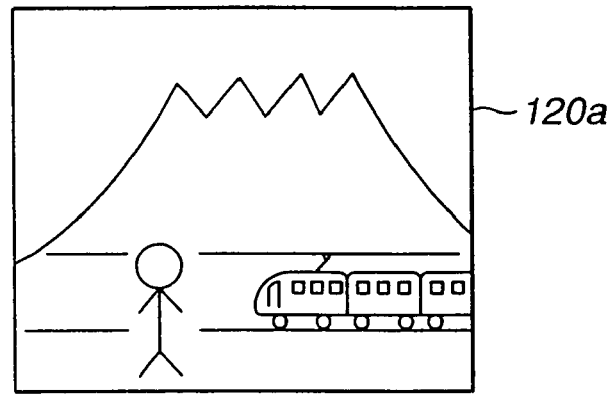
FIG. 22A is the explanatory drawing of the original video.
Figure 22B:
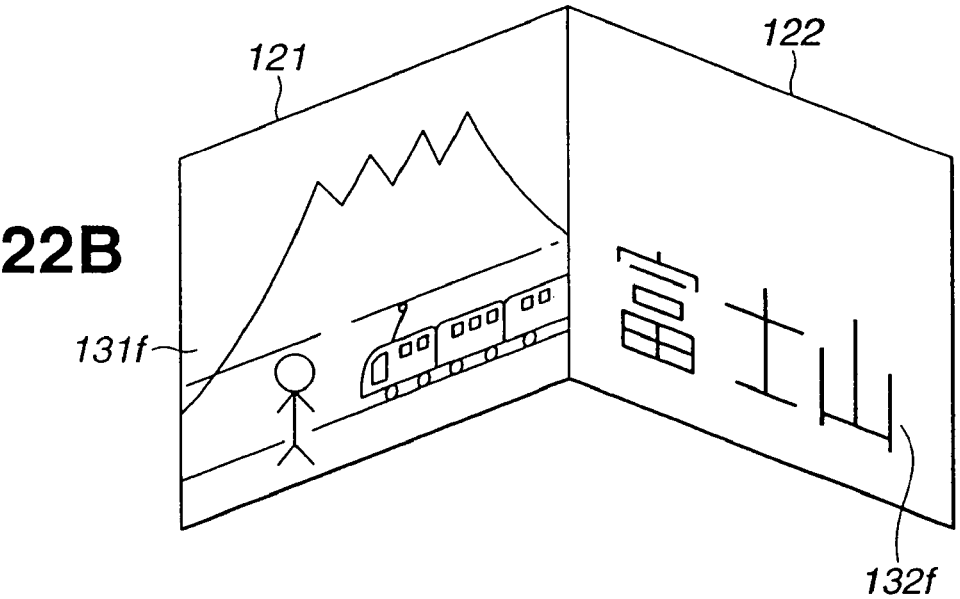
FIG. 22B is a perspective view of a two-screen having a second display screen video information (character information)

FIG. 22 shows the second display screen video information which is the character information. FIG. 22A shows the original video 120a, while FIG. 22B shows an example of display on the two-screen picture display device. The first display screen 121 displays an original picture 131f, while the second display screen 122 projects a character information 132f. The character information 132f relates to a video (the original picture 131f) projected on the first display screen 121. The two-screen display video information in FIG. 22 is generated with the two-screen display video information generating system (to be described afterward).

Figure 23A:
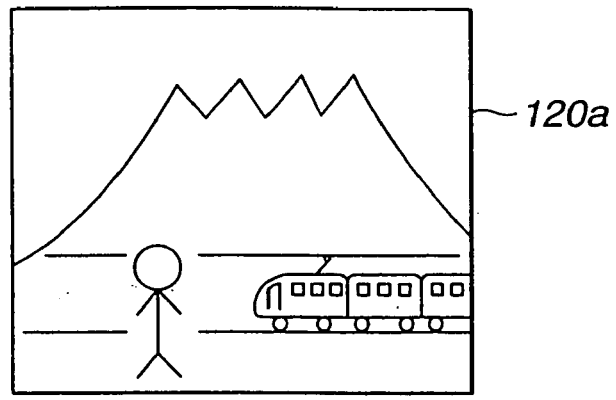
FIG. 23A is the explanatory drawing of the original video.
Figure 23B:
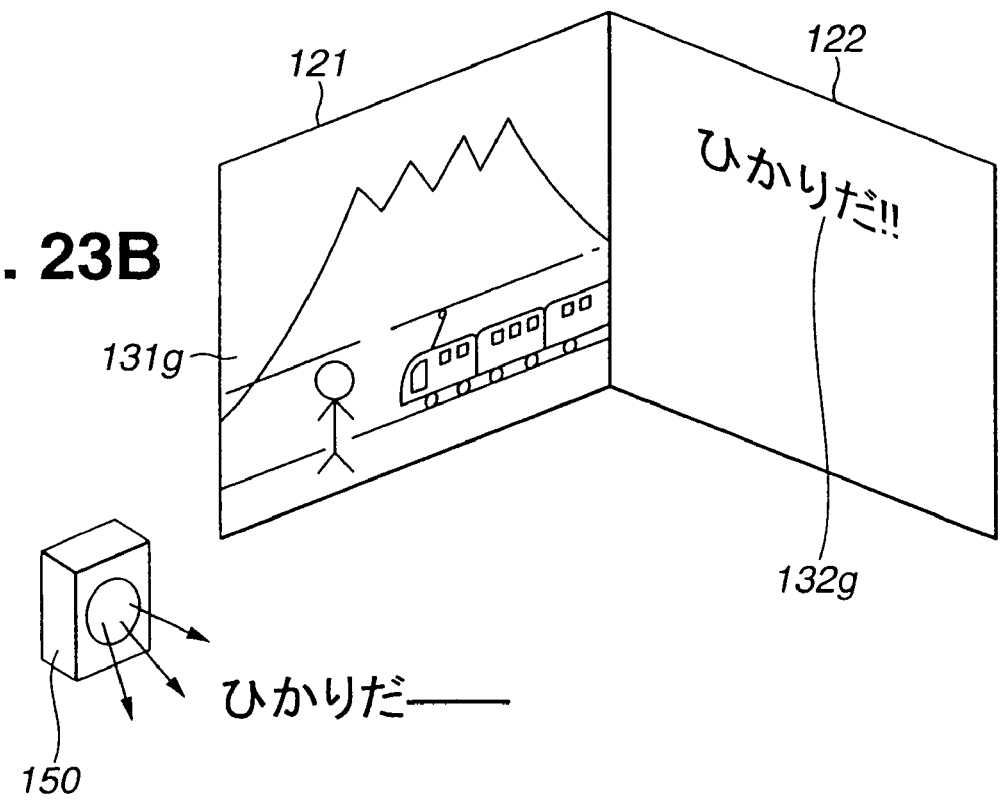
FIG. 23B is a perspective view of the two-screen having the second display screen video information (character information converted from sound)

FIG. 23 shows the second display screen video information which is the character information converted from a sound information. FIG. 23A shows the original video 120a, while FIG. 23B shows an example of display on the two-screen picture display device. The first display screen 121 displays an original picture 131g, while the second display screen 122 displays a character information 132g. The character information 132g relates to a video (the original picture 131g) projected on the first display screen 121. The character information 132g is converted from a sound information which is outputted, for example, from a speaker 150. The two-screen display video information in FIG. 23 is generated with the two-screen display video information generating system (to be described afterward).

Figure 24:
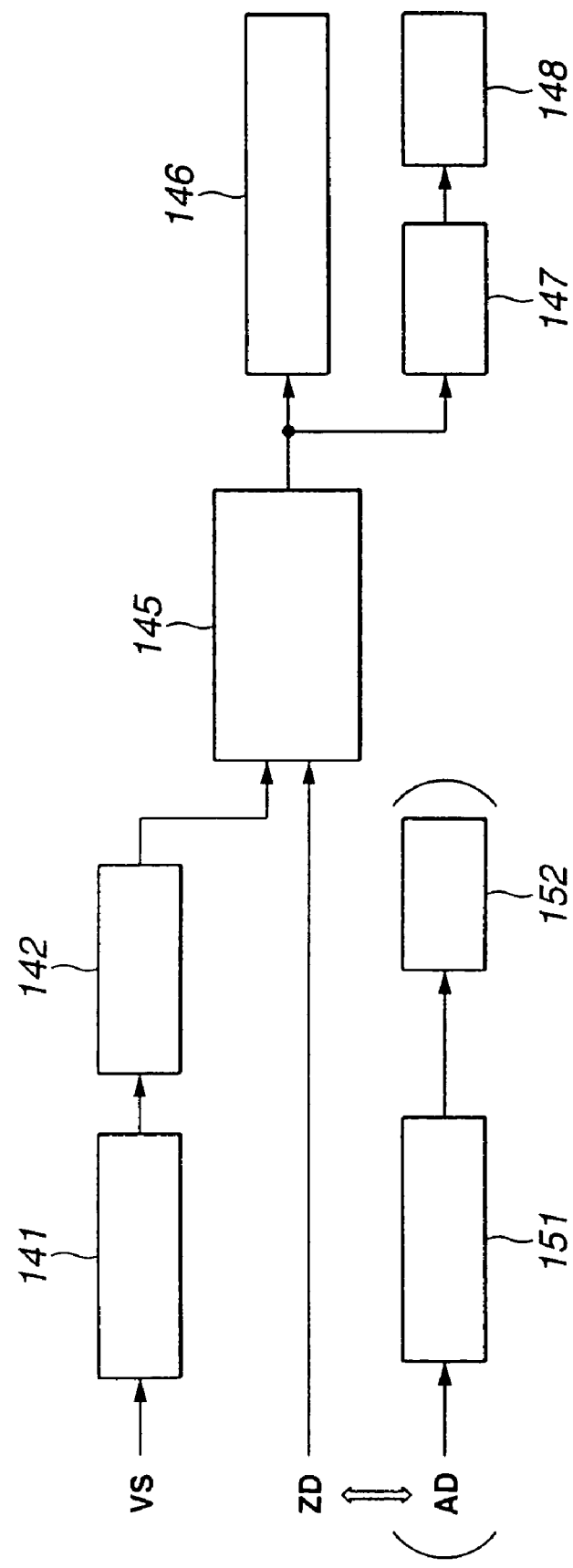
FIG. 24 is the second mode for carrying out the invention, showing a block diagram of a constitution of the two-screen display video information generating system.

Described hereinafter referring to FIG. 24 is a systematic constitution of the two-screen display video information generating system which is described in FIG. 22 and FIG. 23. In FIG. 24, parts and sections substantially the same as those in FIG. 21 are denoted by the same numerals.

At first, the video signal VS is converted into a digital data with the digitizer 141. Then, the thus converted digital data is stored in the picture memory 142. The digital data and a character information ZD are converted into the "video signal constituting nest" by means of the two-screen display video signal converter 145.

Namely, of the above described data, the two-screen display video signal converter 145 reverses a display of the second display screen data which is the character data. Moreover, the two-screen display video signal converter 145 assigns the character data and the data (of the picture memory 142) alternately to the respective divided areas (of the screen) divided by the predetermined rule, to thereby generate the two-screen display video information constituting nest.

Inputting the two-screen display video information into the two-screen picture display device 146 such as the one described in the conventional example (for example, the device in FIG. 30 and FIG. 31) allows the viewer to view the desired two-screen video. In addition, inputting the two-screen display video information into the recording device 147 allows recordation and storage thereof in the recording medium 148 such as the optical disk, the magnetic tape and the like. Herein, the character information ZD is allowed to constitute the video information with the character obtained in the following manner: Recognize the sound with a sound recognition device 151, then convert the sound into the character with a character producer 152. Moreover, another language translated is also allowed for display.

Third Mode for Carrying Out the Invention:

The third mode for carrying out the invention is concerning a video information displayed on a display device having a first display screen and a second display screen forming therebetween a predetermined angle θ (for example, the first display screen is a liquid crystal, while the second display screen is a mirror). On the first display screen, an original video information generates the video information constituting nest; while on the second display screen, a character information (relating to the original video information) of at least one of a plurality of languages generates the video information constituting nest.

Figure 25A:
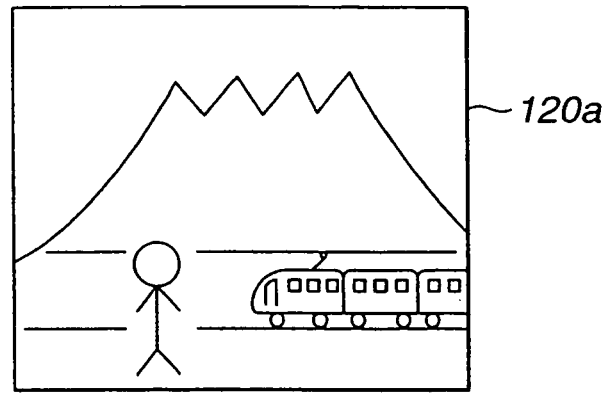
FIG. 25A is the explanatory drawing of the original video.
Figure 25B:
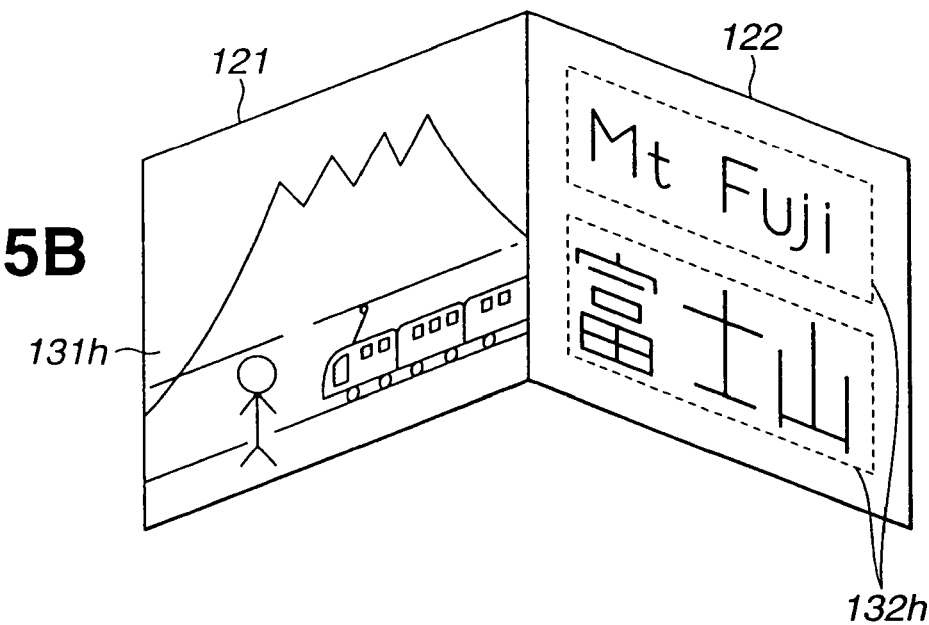
FIG. 25B is a perspective view of a two-screen having a second display screen video information (a plurality pieces of character information)

FIG. 25 shows the second display screen video information which is the character information of two languages among the plurality of languages (which character information relates to the original video information). FIG. 25A shows the original video 120*a*, while FIG. 25B shows an example of display on the two-screen picture display device.

The first display screen 21 displays an original picture 131*h*, while the second display screen 122 projects a character information 132*h*. The character information 132*h* is of two languages (English and Japanese) among the plurality of languages. The character information relates to a video (the original picture 131*h*) projected on the first display screen 121.

The two-screen display video information in FIG. 25 is generated with the two-screen display video information generating system (to be described afterward). A user can determine which language to select for the character information 132*h*. In addition, not limited to the language, categorized pieces of information relating to the video are allowed for display.

Figure 26:
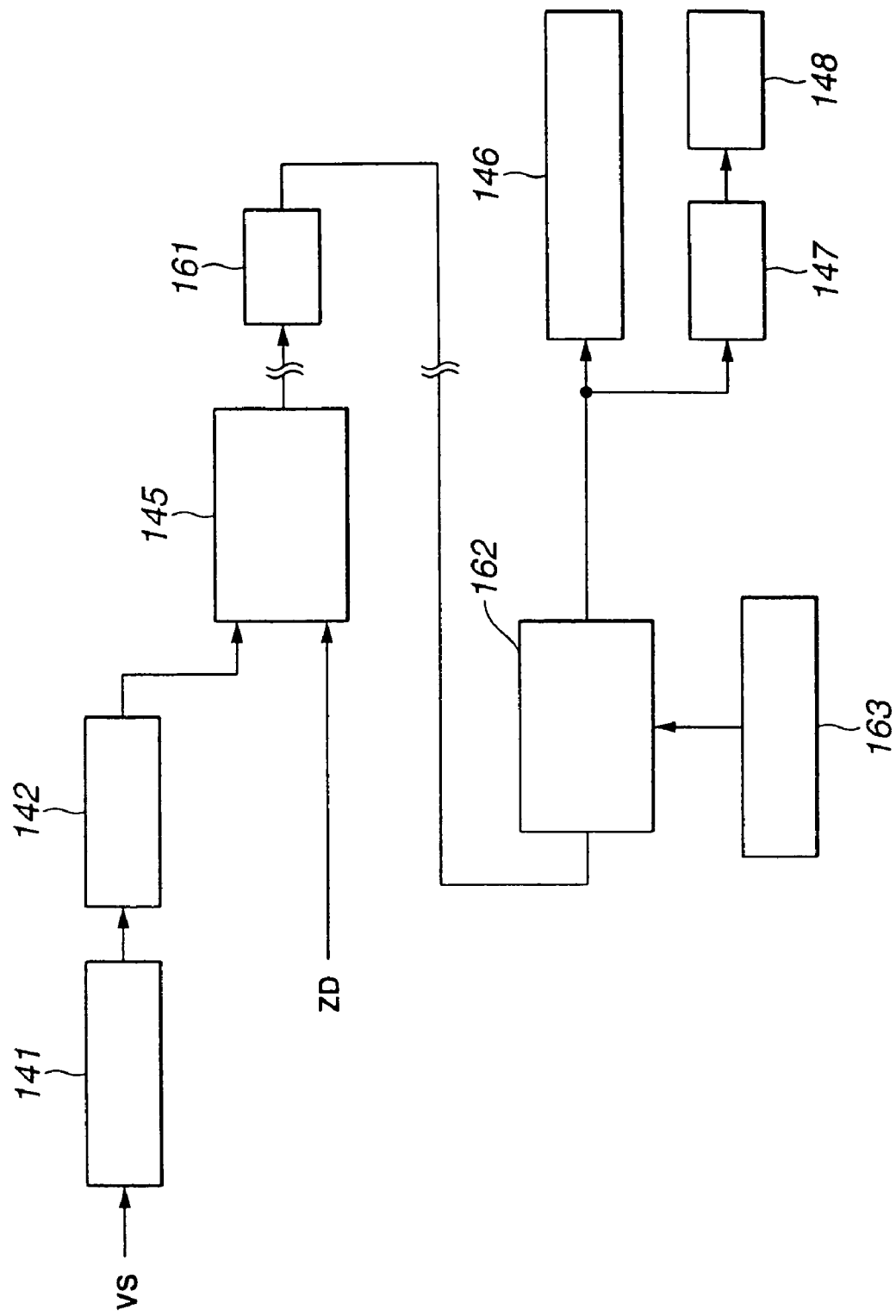
FIG. 26 is the third mode for carrying out the invention, showing a block diagram of a constitution of the two-screen display video information generating system.

Described hereinafter referring to FIG. 26 is a systematic constitution of the two-screen display video information generating system which is described in FIG. 25. In FIG. 26, parts and sections substantially the same as those in FIG. 21 are denoted by the same numerals. At first, the video signal VS is converted into a digital data with the digitizer 141. Then, the thus converted digital data is stored in the picture memory 142. The digital data and the character information ZD (distinctive of a plurality of languages, a plurality of categories, and genre) are converted into the "video signal constituting nest" by means of the two-screen display video signal converter 145.

Namely, of the above described data, the two-screen display video signal converter 145 reverses a display of the second display screen data which is the character data. Moreover, the two-screen display video signal converter 145 assigns the character data and the data (of the picture memory 142) alternately to the respective divided areas (of the screen) divided by the predetermined rule, to thereby generate the two-screen display video information constituting nest.

Then, the user can view the desired two-screen video with the following sequential steps: 1. A video signal of the two-screen display video signal converter 145 is delivered to users (unspecified many) by way of a cable or a transmission system (of radio wave), or by means of the recording medium. 2. The video information is restored with a two-screen display video signal restorer 162. 3. The video information is inputted into the two-screen picture display device 146.

In addition, inputting the two-screen display video information into the recording device 147 allows recordation and storage thereof in the recording medium 148 such as the optical disk, the magnetic tape and the like. Inputting an instruction from a character information selector 163 into the two-screen display video signal restorer 162 (or the two-screen picture display device 146), the individual user can select the character information in accordance with his/her language, taste and the like. Furthermore, not limited to the language, categorized pieces of information relating to the video are allowed for input.

Fourth Mode for Carrying Out the Invention:

The fourth mode for carrying out the invention is concerning a video information displayed on a display device having a first display screen and a second display screen forming therebetween a predetermined angle θ (for example, the first display screen is a liquid crystal, while the second display screen is a mirror). On the first display screen, a picture drawing information generates the video information constituting nest; while on the second display screen, a drawn picture information generates the video information constituting nest.

Figure 27:
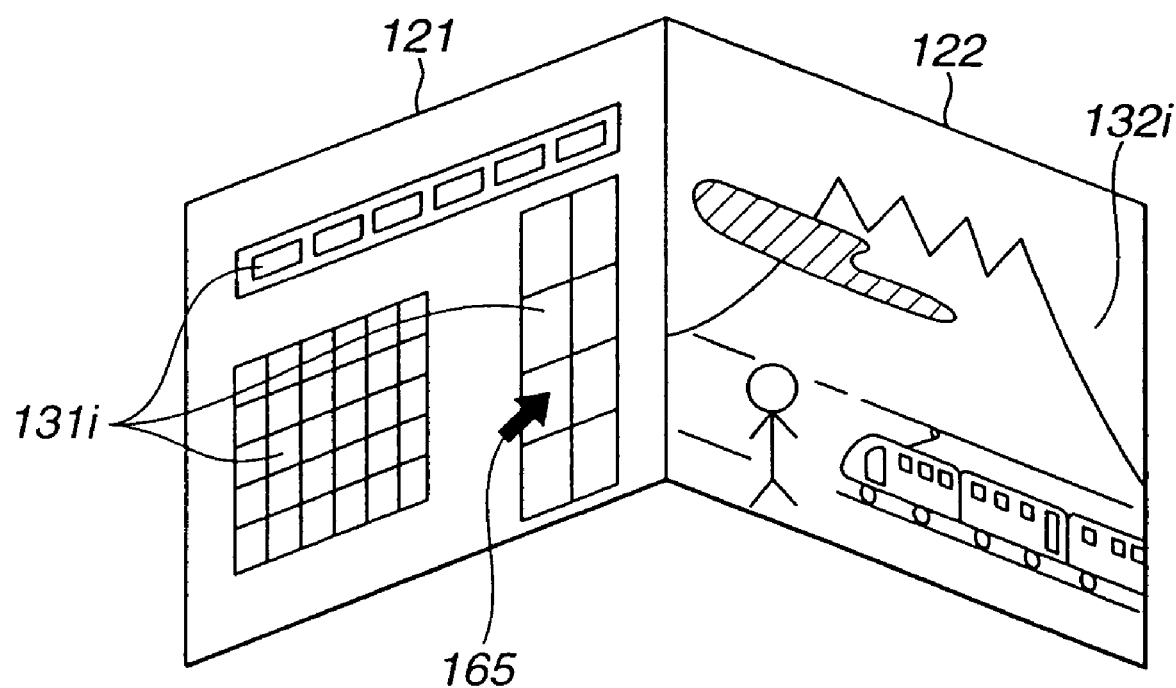
FIG. 27 is a fourth mode for carrying out the invention applied to the two-screen display video information generating system, showing a perspective view of the two-screen having a picture drawing information on a first display screen while a drawn picture information on the second display screen.

In FIG. 27, the first display screen 121 displays a picture drawing information 131*i* of a picture drawing device such as a personal computer and the like. The picture is drawn in such a manner that the user selects the picture drawing information 131*i* with a pointer 165 and the like. The second display screen 122 displays a thus drawn picture 132*i*.

FIG. 27 shows a picture taken with a camera and the like, the picture added by a slant line section (cloud). According to the fourth mode for carrying out the invention, as a matter of course, all pictures are allowed to be drawn with the personal computer and all picture drawing functions of the picture drawing device are available.

According to the conventional art, the picture drawing information and the drawn picture are not displayed simultaneously in full size. The present invention, however, achieves the simultaneous display, in full size, of the picture drawing information and the drawn picture. In addition, allowing the pointer 165 to move equally on a display window from the first display screen to the second display screen expands working area freely.

Figure 29:
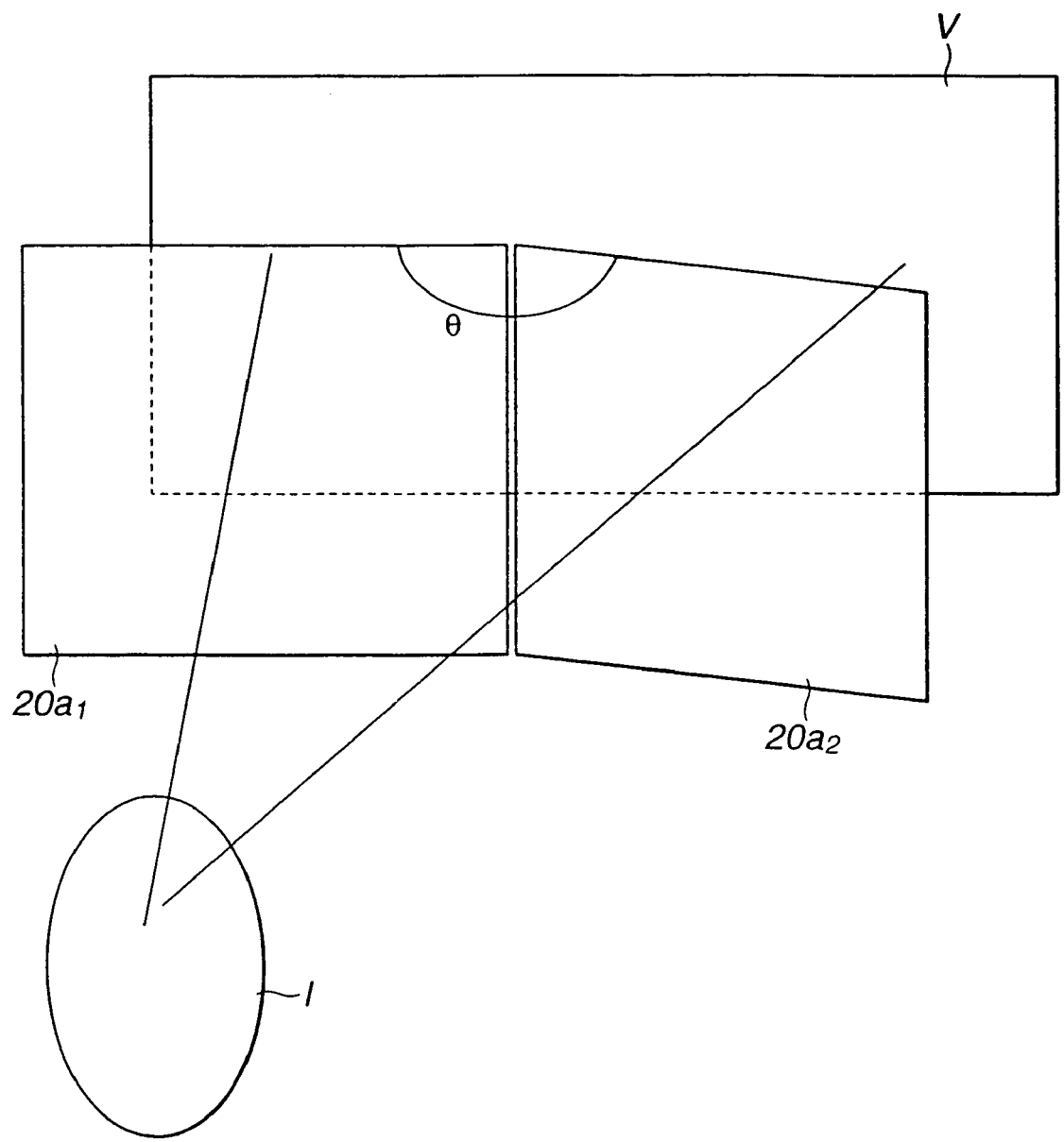

Namely, as is seen in FIG. 29, a desk top area can be magnified, for display, to a display surface (virtual display surface V) that is two times as large as the original display device. FIG. 29 shows an example of sideward expansion. The expansion is, however, not limited to this. In other words, a universal expansion such as leftward, rightward, upward, and downward expansion is allowed. Moreover, with the free expansion of the working area, an entire screen display (of a first display surface 20*a*1 in combination with a second display surface 20*a*2) is allowed, and an entire screen display of each of the first display surface 20*a*1 and the second display surface 20*a*2 is allowed. Thereby, free expansion of display is also allowed.

Figure 28:
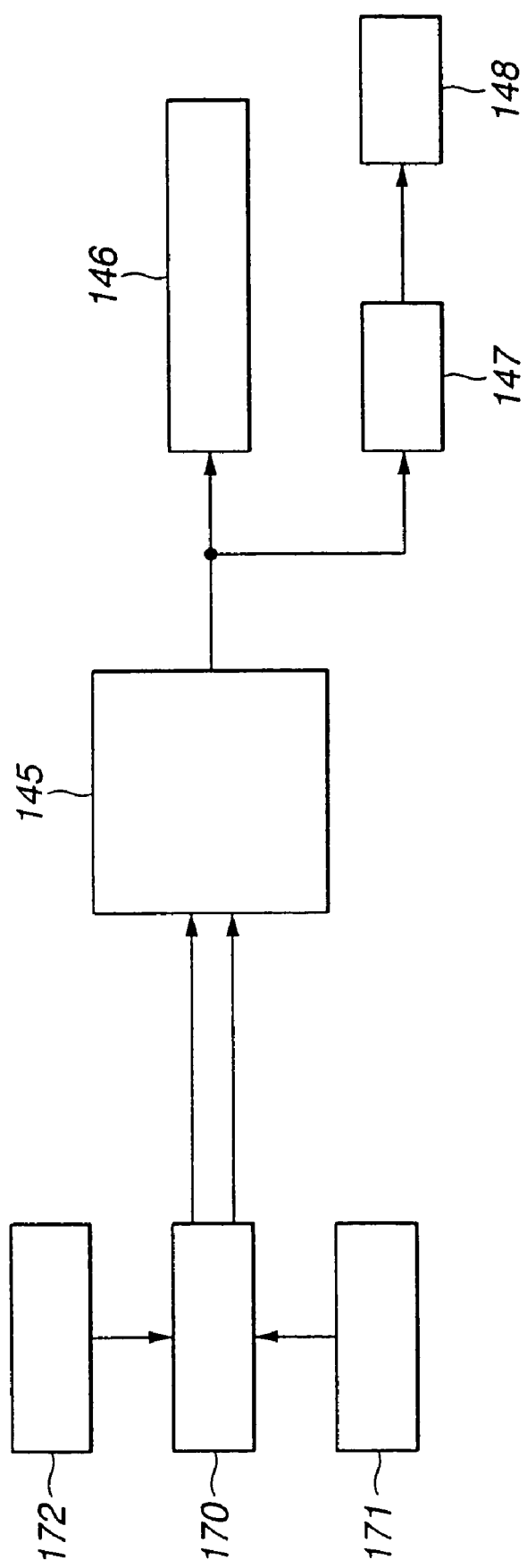
FIG. 28 is the fourth mode for carrying out the invention, showing a block diagram of a constitution of the two-screen display video information generating system.

Described hereinafter referring to FIG. 28 is a systematic constitution of the two-screen display video information generating system which is described in FIG. 27. In FIG. 28, parts and sections substantially the same as those in FIG. 21 are denoted by the same numerals. A picture drawing device 170 is, for example, the personal computer in which a predetermined picture drawing software is operated. The picture drawing information is instructed by way of an instruction input device 171 such as a key board and the like. Moreover, a basic picture is allowed to be inputted from a picture input device 172 such as a scanner, a video camera, and the like. As a matter of course, the personal computer is allowed to draw all pictures.

The picture drawing information and the picture being drawn are outputted from the personal computer (picture drawing device 170). These two pieces of information are converted into the above "video information constituting nest" by means of the two-screen display video signal converter 145.

Namely, the two-screen display video signal converter 145 reverses a piece of information displayed on the second display screen, which information is one of the picture drawing information and the drawn picture information. Moreover, the two-screen display video signal converter 145 assigns the picture drawing information and the drawn picture information alternately to the respective divided areas (of the screen) divided by the predetermined rule, to thereby generate the two-screen display video information constituting nest.

Inputting the two-screen display video information into the two-screen picture display device 146 described in the conventional example (for example, the device in FIG. 30 and FIG. 31) allows the viewer to view the desired two-screen video. In addition, inputting the two-screen display video information into the recording device 147 allows recordation and storage thereof in the recording medium 148 such as the optical disk, the magnetic tape and the like.

Summarizing above, under the present invention, the viewer can view, simultaneously with the original picture of the original video information, the following pictures and information: 1. a static picture of the original picture. 2. an extraction picture of a specific object. 3. a deletion picture of the specific object. 4. an enlarged picture of the specific object. 5. a different view-point picture of the specific object. 6. character information. 7. a character information converted from a sound information (accompanying the original video information). 8. a picture and character information (relating to the original picture) which are processed from the original picture in various manners (such as: a drawn picture information developed based on a picture drawing information). 9. character information relating to the original picture, and required by a user.

INDUSTRIAL APPLICABILITY

The present invention is applicable to other multi-picture display device than those described above. In addition, use of liquid crystal display element, CRT or LED display for the display surface allows low-cost production of a bright large multi-picture that is usable even outdoors.

The invention claimed is:

1. A multi-picture simultaneous display device comprising:
   a mixed picture display part for displaying two display modes via a switching operation per field, a first display mode displaying one piece of video information on an entire area of a display screen, and a second display mode displaying the other pieces of the video information on a plurality of divided areas of the display screen in such a manner as to assign the other pieces of the video information to the respective divided areas which are divided by a rule;
   a first picture separating mechanism disposed on the mixed picture display part, and defining a first polarizing element;
   a plurality of optical means each of which is disposed in such a manner as to form a predetermined angle relative to the mixed picture display part; and
   a second picture separating mechanism for separating a picture displayed on the mixed picture display part and on the plurality of the optical means so as to allow the picture to be viewable, the second picture separating mechanism defining a second polarizing element which is different in a polarizing direction than that of the first polarizing element of the first picture separating mechanism; and wherein,
   the polarizing direction of one of the first picture separating mechanism and the second picture separating mechanism is switched synchronously with the switching between the first display mode and the second display mode.

2. The multi-picture simultaneous display device as claimed in claim 1, wherein the plurality of the optical means have such a function as to reverse a picture and to rotate a polarized light by reflection.

3. The multi-picture simultaneous display device as claimed in claim 1, wherein each of the plurality of the optical means is a mirror.

4. The multi-picture simultaneous display device as claimed in claim 1, wherein the first picture separating mechanism and the second picture separating mechanism are formed with a combination of a linearly polarizing element.

5. The multi-picture simultaneous display device as claimed in claim 1, wherein the first picture separating mechanism and the second picture separating mechanism are formed with a combination of a circularly polarizing element.

6. The multi-picture simultaneous display device as claimed in claim 1, wherein the divided areas of the mixed picture display part comprise at least one of the following two:
   a first divided area and a second divided area formed by separating the display screen, respectively, into left and right, and
   a third divided area and a fourth divided area formed by separating the display screen, respectively, into upper and lower; and
   wherein the plurality of the optical means are disposed in at least one of the following two ways:
   sidewise relative to the mixed picture display part, and
   lengthwise relative to the mixed picture display part.

7. The multi-picture simultaneous display device as claimed in claim 1, wherein the plurality of the optical means have a door mechanism for opening and closing.

8. A multi-picture simultaneous display method comprising the steps of:
   displaying the following two display modes via a switching operation per field:
   a first display mode displaying a plurality of pieces of video information, one piece of the video information being displayed on an entire area of a display screen, and
   a second display mode displaying the other pieces of the video information on a plurality of divided areas of the display screen in such a manner as to assign the other pieces of the video information to the respective divided areas which are divided by a rule; and
   switching a picture separating mechanism synchronously with the switching operation of the first display mode and the second display mode so that a picture displayed on the display screen and on a plurality of optical means is allowed to be viewable via the picture separating means.

* * * * *